United States Patent
Marripudi et al.

(10) Patent No.: US 10,209,750 B2
(45) Date of Patent: Feb. 19, 2019

(54) SSD DRIVEN SYSTEM LEVEL THERMAL MANAGEMENT

(71) Applicant: Samsung Electronics Co., Ltd., Suwon-si, Gyeonggi-do (KR)

(72) Inventors: Gunneswara R. Marripudi, Fremont, CA (US); Ajit Yagaty, Santa Clara, CA (US); Subramanyam Varanasi, San Francisco, CA (US); Suhas, San Jose, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 128 days.

(21) Appl. No.: 15/188,940

(22) Filed: Jun. 21, 2016

(65) Prior Publication Data
US 2017/0315599 A1    Nov. 2, 2017

Related U.S. Application Data

(60) Provisional application No. 62/330,842, filed on May 2, 2016.

(51) Int. Cl.
*G06F 1/00*    (2006.01)
*G06F 1/26*    (2006.01)
*G06F 1/32*    (2006.01)
*G06F 1/20*    (2006.01)

(52) U.S. Cl.
CPC ........................... *G06F 1/206* (2013.01)

(58) Field of Classification Search
CPC ....................................................... G06F 1/32
See application file for complete search history.

(56) References Cited

U.S. PATENT DOCUMENTS

| | | | |
|---|---|---|---|
| 8,200,358 B2 | 6/2012 | Sendelbach et al. | |
| 8,996,751 B2 | 3/2015 | Pereira et al. | |
| 9,047,068 B2 | 6/2015 | Pereira | |
| 2002/0147564 A1* | 10/2002 | Lamb | G01K 7/42 702/132 |
| 2007/0260815 A1* | 11/2007 | Guha | G06F 1/3203 711/114 |
| 2009/0177334 A1* | 7/2009 | Artman | G06F 1/206 700/300 |
| 2009/0300374 A1* | 12/2009 | Mori | G06F 1/3203 713/300 |
| 2010/0262312 A1* | 10/2010 | Kubota | H01M 10/425 700/295 |
| 2012/0054520 A1* | 3/2012 | Ben-Tsion | G06F 1/30 713/322 |
| 2013/0208419 A1* | 8/2013 | Li | G06F 1/206 361/679.48 |
| 2014/0049918 A1* | 2/2014 | Chainer | H05K 7/20772 361/702 |

(Continued)

*Primary Examiner* — Mohammed H Rehman
(74) *Attorney, Agent, or Firm* — Renaissance IP Law Group LLP

(57) ABSTRACT

A storage device capable of providing instructions to modify a cooling system in support of its own operations is described. The storage device may include data storage to store data. The storage device may also include one or more operation sensors to determine a change in the operating conditions of the storage device. Finally, the storage device may include a transmitter to transmit the change in the operation conditions of the storage device to a Thermal Management System (TMS).

27 Claims, 18 Drawing Sheets

(56) References Cited

U.S. PATENT DOCUMENTS

2014/0344482 A1    11/2014  Hu et al.
2016/0227675 A1*    8/2016  North ................. H05K 7/20836
2017/0295677 A1*   10/2017  Shelnutt ............ H05K 7/20836
2018/0035572 A1*    2/2018  Song .................. H05K 7/20836

* cited by examiner

SSD DRIVEN SYSTEM LEVEL THERMAL MANAGEMENT

RELATED APPLICATION DATA

This application claims the benefit of U.S. Provisional Patent Application Ser. No. 62/330,842, filed May 2, 2016, which is incorporated by reference herein for all purposes.

FIELD

The inventive concepts relate generally to Solid State Drives (SSDs), and more particularly to enabling SSDs to influence thermal management within a computer system.

BACKGROUND

System level thermal management is a primary requirement for all server and storage node chassis. Semiconductor components in a system are typically built to operate under certain thermal conditions. Systems may integrate thermal management as part of their core functionality to protect all components in a system from overheating.

Servers in standard form factor designs (e.g., 2 U rack servers) are usually equipped with fans to circulate cooler air over the components in servers. In addition, some components that dissipate more power, such as Central Processing Units (CPUs) and Input/Output (I/O) cards, also use active (with a localized fan) or passive heatsinks to maintain operating thermal environments within the respective component specification.

In modern server designs, system level thermal management is primarily driven by the workloads on CPUs. When the utilization of CPUs goes up in a server, so do the speeds of fans in the systems (up to configured Revolutions Per Minute (RPM) levels to meet noise levels of data centers). Such systems may include a feedback loop between CPU power dissipation levels and fans providing thermal management in a server, to balance the competing objectives of keeping the system components cool and keeping noise levels at a minimum.

Solid State Drive (SSD) devices in standard drive form factors such as M.2, 2.5-inch, 3.5-inch, and Peripheral Component Interconnect Express (PCIe) adapter card form factors used in servers rely on the system level thermal management. But SSDs are not part of the feedback loop to manage fan speed settings. With conventional SSDs, where SSD workload is correlated to CPU utilization, CPU driven thermal management might be sufficient. But newer classes of SSDs may include In-Storage Compute (ISC)-capable SSDs and Network Attach Storage (NAS) SSDs, to name two examples. In such newer classes of SSDs, SSD power utilization may not be in lock-step correlation with CPU utilization in the servers.

NAND flash media is sensitive to operating thermal environment. If the ambient temperature exceeds operating specifications, the NAND flash media may experience increased bit error rates and thus a potential data loss situation and/or decreased performance levels. So when SSDs operate at higher utilization levels and associated server CPUs are operating at lower utilization levels that do not warrant increased fan speed, this combination could lead to data integrity issues or lower performance levels in a system.

A need remains for a way to maintain proper operating temperatures for SSDs and other storage devices.

DETAILED DESCRIPTION

Figure 1:
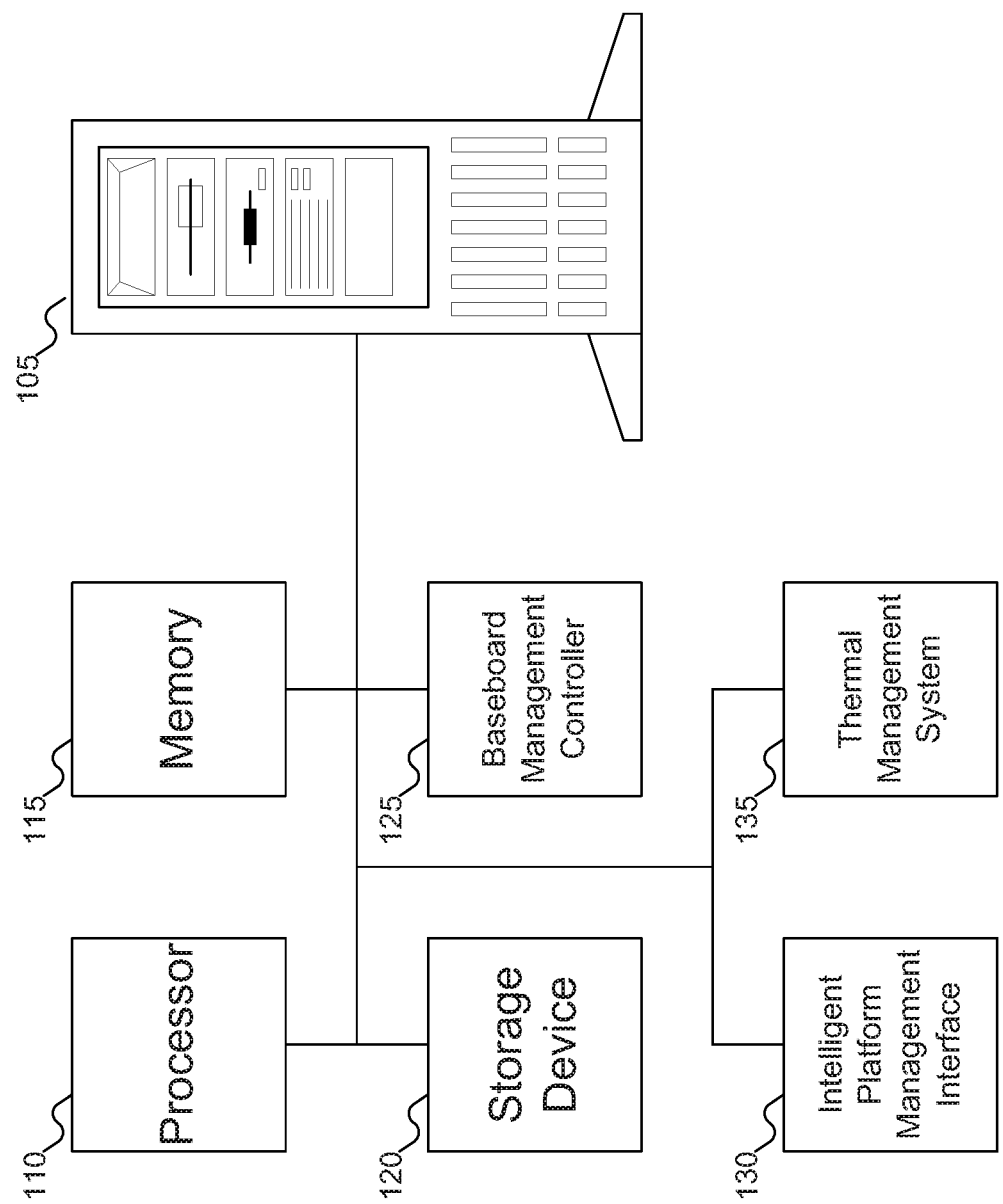
FIG. 1 shows a server with a storage device that may affect its cooling mechanism, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Conventional system level thermal management solutions in servers use fans that may operate at different speeds. Servers are usually equipped with several fans for thermal management. While such fans may be configured to run at high speeds all the time, high fan speeds lead to increased noise levels in data centers, which might not meet the normal operating guidelines of data centers. So server systems are built with a feedback loop between Central Processing Unit (CPU) usage and fan speed. As CPU utilization increases in a server, the speeds of fans may be automatically adjusted to meet the thermal needs.

A server may have several thermal sensors on the motherboard and backplane connected to the Baseboard Management Controller (BMC) across a System Management Bus (SMBus) and/or an Inter-Integrated Circuit (I²C or I2C) bus. The BMC may use a pre-configured sensor profile to read temperatures and takes action if the temperature reading threshold on the sensor reaches a critical level as set in the thermal profile. The BMC may regularly adjust the fan speeds based on the sensor inputs and the thermal budget for the system. For example, there may be one or more sensors on the backplane in close proximity to the SSDs and these might generally represent the current thermal conditions of the SSDs together or as a group of SSDs. When the backplane sensor in a region reports a critical temperature due to one or more SSDs heating up, the BMC may drive the speed of the fan corresponding to the sensor to cool that region in the chassis, thereby cooling the SSDs. But the SSD temperature is only indirectly reported to the BMC by the sensor in that region of the backplane. Currently, there is no specific way to use the temperature readings of an individual SSD.

There are several drawbacks with the conventional system level thermal design when the system uses new classes of SSDs with higher power ratings. For example, in a dual-socket 2 U server with 24 2.5-inch SSDs, the CPUs might use 290 watts. But depending on the classes of SSDs used, the SSDs might use 216-600 watts, or even potentially more or less. SSDs may account for a significant percentage of the power budget, but are not part of system level thermal management feedback loop.

In the absence of an active thermal management feedback loop that includes SSDs, when faced with higher ambient temperatures, SSDs could resort to operating at lower performance levels to reduce media errors. However, operating at lower performance levels could lead to reduced and nondeterministic performance, which could affect system Service Level Agreements (SLAs). Alternatively, systems could be designed to provide localized active thermal management solutions, e.g., using local fans as in NIC cards. But the M.2 form factor does not specify keepout areas for fans, and typical 2.5-inch form factor SSDs might not accommodate active fans embedded in the SSD case. And even if one could design a customized fan, this customized fan would introduce mechanical components that could affect the reliability and Mean Time Between Failure (MTBF) rates of SSDs.

By providing a mechanism through which an SSD or other storage device may affect the cooling mechanism of the system, SSDs and/or storage devices may continue to operate even when temperature might increase. Upon crossing a configured temperature threshold, the SSD firmware may raise an interrupt. This interrupt may trigger the kernel interrupt handler and may invoke the driver. Alternatively, the driver may poll the SSD to fetch the temperature information. The driver may then read the temperature information, and based on the thermal profiles set by the administrator the driver determines whether any action needs to be taken. If action is needed, the driver may determine which cooling zone is mapped to the SSD at hand and may instruct the BMC via the Intelligent Platform Management Interface (IPMI) driver to increase/decrease the appropriate fan's speed.

FIG. 1 shows a server with a storage device that may affect its cooling mechanism, according to an embodiment of the inventive concept. In FIG. 1, server 105 is shown. Server 105 may include processor 110 (also referred to as a Central Processing Unit (CPU)), memory 115, and storage device 120. Processor 110 may be any variety of processor: for example, an Intel Xeon, Celeron, Itanium, or Atom processor, an AMD Opteron processor, an ARM processor, etc. Memory 115 may be any variety of memory, such as non-volatile memory (e.g., flash memory), Static Random Access Memory (SRAM), Persistent Random Access Memory (PRAM), etc. but is typically Dynamic Random Access Memory (DRAM). Storage device 120 may be any variety of storage device: for example, a Solid State Drive (SSD). Storage device 120 may also be used just for storage purposes, either within server 105 or as Network Attached Storage (NAS) accessible via a network (not shown in FIG. 1). Storage device 120 may also offer In Storage Compute (ISC) capability, or other capabilities. While server 105 is depicted in FIG. 1 as a tower computer, server 105 may be replaced with a rack server or any machine that offers comparable functionality, such as a laptop computer, desktop computer, or portable computing device, such as a smartphone, with no loss of generality.

In addition to processor 110, memory 115, and storage device 120, server 105 may include Baseboard Management Controller (BMC) 125, Intelligent Platform Management Interface (IPMI) 130, and Thermal Management System (TMS) 130. BMC 125 may be a specialized microcontroller embedded on the motherboard of server 105. BMC 125 may manage the interface between system management software and platform hardware. IPMI 130 may include a set of computer interface specifications for an autonomous computer subsystem that provides management and monitoring capabilities independently of the host system's CPU, firmware, and operating system. TMS 135 may provide an interface (or part of one) between storage device 120 on the one hand and BMC 125 and IPMI 130 on the other hand.

Figure 2:
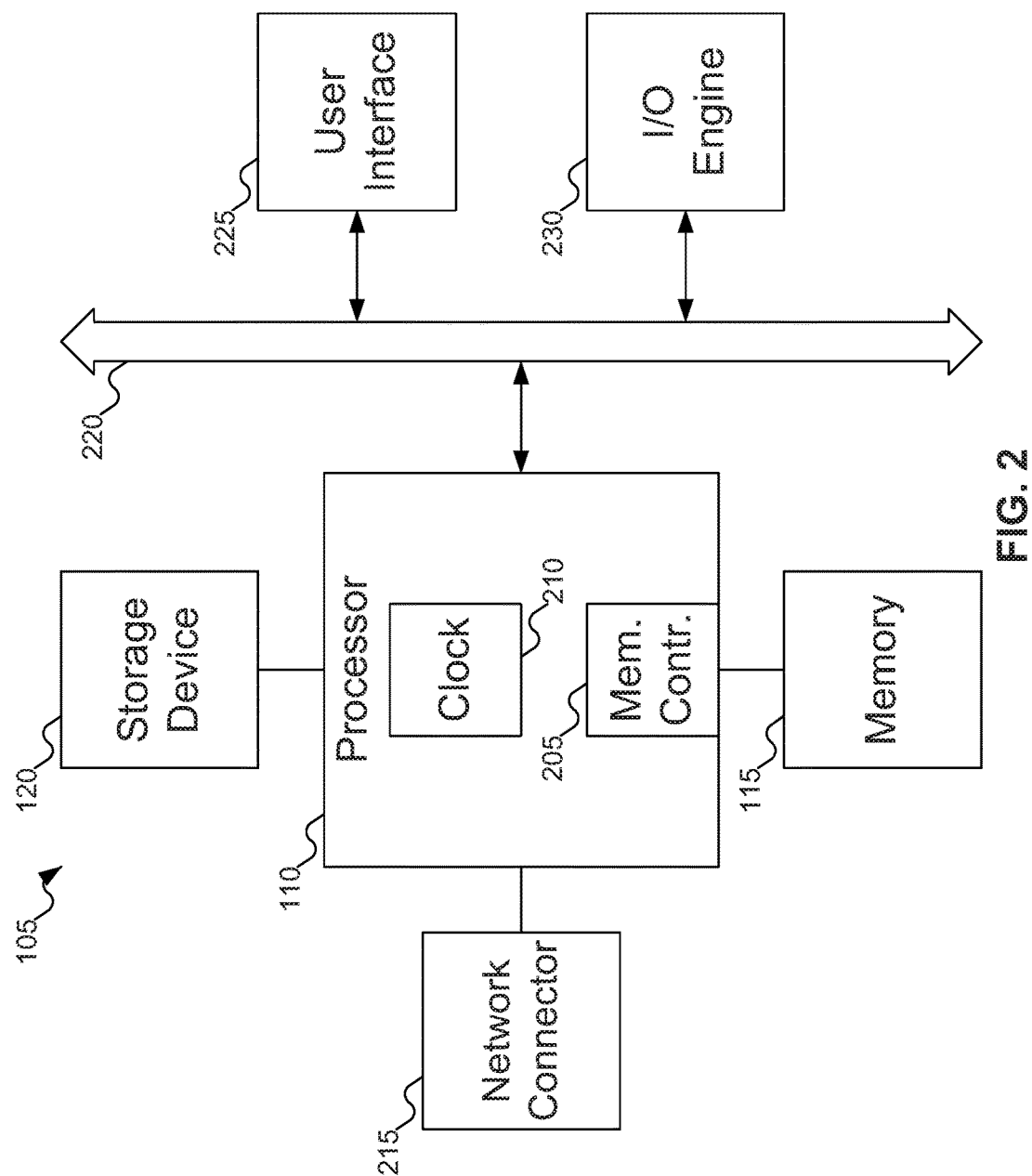
FIG. 2 shows additional details of the server of FIG. 1.

FIG. 2 shows additional details of the server of FIG. 1. Referring to FIG. 2, typically, machine or machines 105 include one or more processors 110, which may include memory controller 205 and clock 210, which may be used to coordinate the operations of the components of machine or machines 105. Processors 110 may also be coupled to memory 115, which may include random access memory (RAM), read-only memory (ROM), or other state preserving media, as examples. Processors 110 may also be coupled to storage devices 120, and to network connector 215, which may be, for example, an Ethernet connector or a wireless connector. Processors 110 may also be connected to a bus 220, to which may be attached user interface 225 and input/output interface ports that may be managed using input/output engine 230, among other components.

Figure 3:
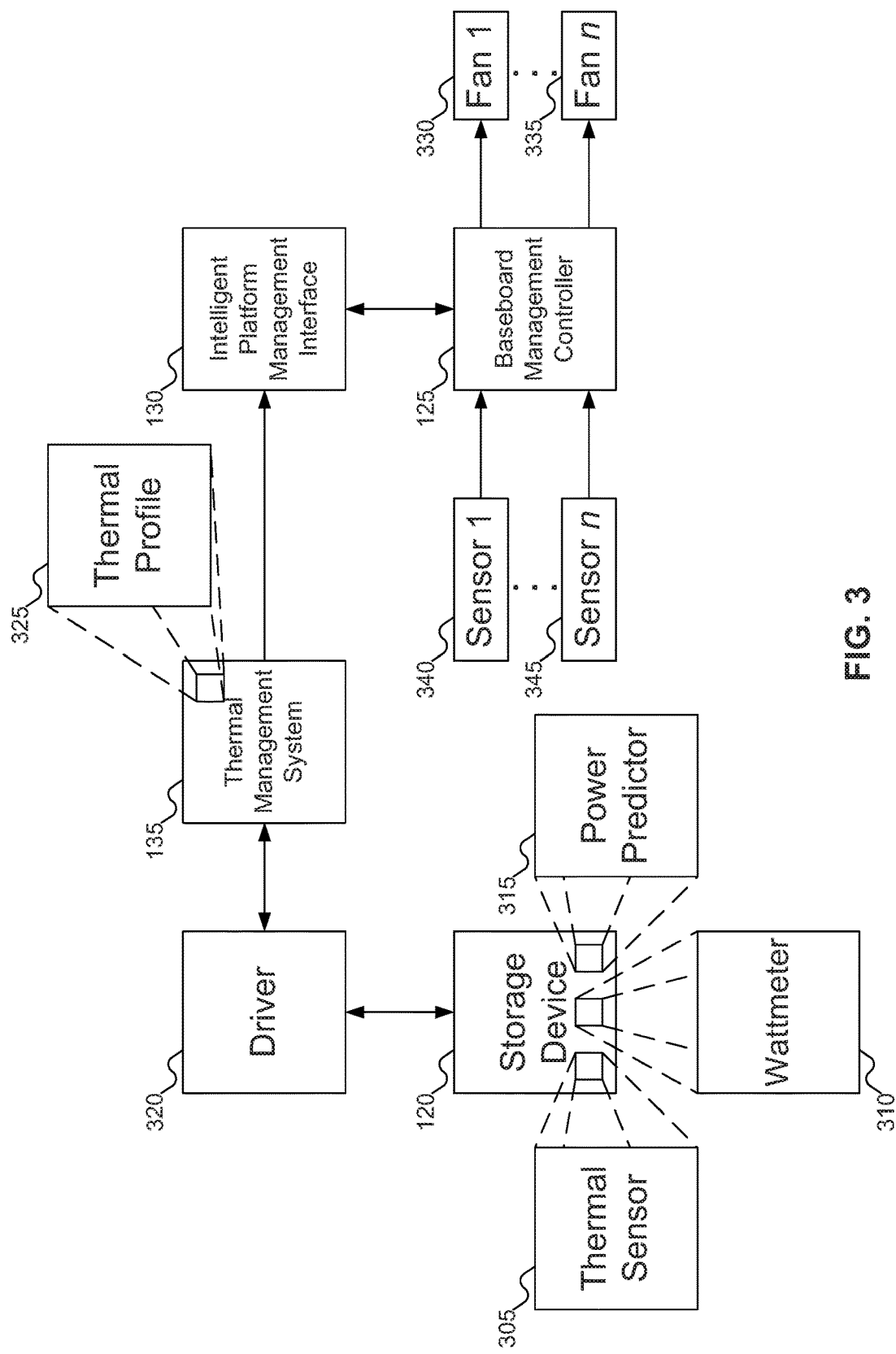
FIG. 3 shows the flow of information between the storage device, Baseboard Management Controller (BMC), and Intelligent Platform Management Interface (IPMI) of FIG. 1.

FIG. 3 shows the flow of information between storage device 120, Baseboard Management Controller (BMC) 125, and Intelligent Platform Management Interface (IPMI) 130 of FIG. 1. In FIG. 3, storage device 120 may include various sensors, such as thermal sensor 305, wattmeter 310, and power predictor 315. Thermal sensor 305 may sense changes in temperature within storage device 120. Wattmeter 310 may sense changes in power used by storage device 120. And power predictor 315 may predict upcoming power requirements of storage device 120.

Power predictor 315 may operate to make power predictions based on past performance. For example, historical data may suggest that storage device 120 draws more power between 9:00 am and 12:00 pm and between 1:00 pm and 5:00 pm: normal business hours excepting for lunch. Outside these hours, storage device 120 has historically experienced low demand, and therefore draws low power. Based on this information, power predictor 315 may predict that power demands will likely increase between these hours. Since increased power results in increased heat within storage device 120, storage device 120 may expect it will need increased cooling from server 105 of FIG. 1 during these hours.

Storage device 120 may include both power predictor 315 and wattmeter 310. Power predictor 315 may predict when storage device 120 will demand increased power, due to predicted operations, such as scheduled times of increased activity. But additional requests may be made of storage device 120 outside of these hours or at other unexpected times. If power demand increases outside these times and server 105 does not provide additional cooling, storage device 120 might experience data loss and/or decreased performance levels. Wattmeter 310 may detect the increased power demand and instruct server 105 to increase the cooling mechanism to compensate.

Embodiments of the inventive concept may include any or all of thermal sensor 305, wattmeter 310, and power predictor 315. That is, one storage device 120 might include just thermal sensor 305, whereas another storage device 120 might include wattmeter 310 and power predictor 315. In addition, embodiments of the inventive concept may support other sensors that provide information that may correlate to the temperature of storage device 120: thermal sensor 305, wattmeter 310, and power predictor 315 are merely example sensors.

When storage device 120 determines that a change in cooling is needed (either to increase or decrease cooling), storage device 120 may communicate with driver 320. Driver 320 may be a device driver that manages communication with storage device 120, and therefore may depend on the implementation of storage device 120. Storage device 120 may send driver 320 whatever information is relevant to the needed change in the cooling mechanism. For example, storage device 120 may send the current temperature as measured by thermal sensor 305, or information about a predicted change in power demanded by storage device 120. Storage device 120 and driver 320 may communicate either via an interrupt-driven model or a polling model. That is, storage device 120 may send information to driver 320 when the information is determined, or driver 320 may periodically query storage device 120 for any available information related to temperature, at which time storage device 120 may provide such information.

Once driver 320 has received the information relevant to temperature from storage device 120, driver 320 may communicate this information to TMS 135. TMS 135 may compare this information with thermal profile 325 to determine what specific change is needed in the cooling system. For example, storage device 120 might not know in which cooling zone it is located, and therefore which specific fans (or other cooling mechanisms) need to be adjusted. Thermal profile 325 may store this information. Thermal profile 325 may also store information about exactly how the cooling mechanism should be adjusted: for example, the speeds to which fans covering the cooling zone should be set.

While FIG. 3 shows only one thermal profile, embodiments of the inventive concept may support any number of thermal profiles, for any number of storage devices (or groups of storage devices). For example, an SSD might support three different power modes, drawing 6, 9, and 12 watts respectively. These different power modes may support different levels of utilization, but require respectively more cooling. Thus, when the SSD is in a low power mode and drawing 6 watts, the cooling mechanism may be set to low speeds (which may have an impact on the noise generated by the system). When the SSD is in medium power mode and drawing 9 watts, the cooling mechanism may be set to higher speeds, increasing the noise of the system but also keeping the SSD operating within normal operating conditions. When the SSD is in high power mode and drawing 12 watts, the cooling mechanism may be set to the highest speeds, further increasing noise but still keeping the SSD within normal operating conditions. These three power modes may be managed using three thermal profiles (or, in other embodiments of the inventive concept, a single "profile" that includes entries that reflect the different power modes and their respective operating conditions). And since each storage device 120 may have different thermal profiles, a single thermal profile might be used in determining the cooling requirements for only one storage device or for two or more storage devices. In addition, while FIG. 3 shows only one storage device 120, embodiments of the inventive concept may support any number of storage devices.

Once TMS 135 has determined what changes are needed to the cooling mechanism, TMS 135 may communicate those changes to BMC 125 via IPMI 130. BMC 125 may then make the appropriate changes. For example, in FIG. 3

BMC 125 may adjust a number of fans, shown as fans 330 through 335. If TMS 135 requests BMC 125 to increase the fan speed for fans covering a particular cooling zone, BMC 125 may identify those fans and increase their speeds.

BMC 125 may also receive input from sensors 340 through 345. BMC 125 may use the inputs from sensors 340 through 345 to dynamically update the speeds of fans 330 through 335. But since sensors 340 through 345 might not provide information about the temperature of storage device 120, BMC 125 might not rely on inputs from sensors 340 through 345 alone. Nor may BMC 125 drop the speeds of fans 330 through 335 below the speed requested by TMS 135 (at least for fans covering the cooling zone including storage device 120), as dropping the fan speeds below that requested by TMS 135 could result in data loss and/or performance degradation by storage device 120. BMC 125 may increase the fan speeds and then drop them back to the original levels, but BMC 125 should not drop the fan speeds below those requested by TMS 135.

While FIG. 3 suggests that there are n fans 330 through 335 and n sensors 340 through 345, embodiments of the inventive concept may support any number of fans and sensors. Further, embodiments of the inventive concept may support differing numbers of fans and sensors.

While FIG. 3 shows a system using fans 330 through 335 to cool components, such as processor 110 of FIG. 1 and storage device 120, embodiments of the inventive concept may support other cooling mechanisms. For example, some systems may employ water- or other coolant-based cooling mechanisms, where BMC 125 may adjust the flow of water or other coolant through piping to cool various components. TMS 135 may instruct BMC 125 how to adjust the flow of coolant in such a system to keep storage device 120 at a thermal condition that is optimal for the needs of storage device 120. For example, TMS 135 may instruct BMC 125 to change the current or the temperature of the coolant in the coolant-based cooling mechanism.

FIG. 1 above shows storage device 120 and BMC 125 as being part of the same server 105 of FIG. 1. While some embodiments of the inventive concept may have storage device 120 and BMC 125 part of the same server 105 of FIG. 1, other embodiments of the inventive concept may separate storage device 120 from server 105 of FIG. 1. For example, storage device 120 may be used as Network Attached Storage (NAS). In such embodiments of the inventive concept, BMC 125 that manages the cooling mechanism for storage device 120 may be different from a BMC that manages server 105 of FIG. 1.

Figure 4:
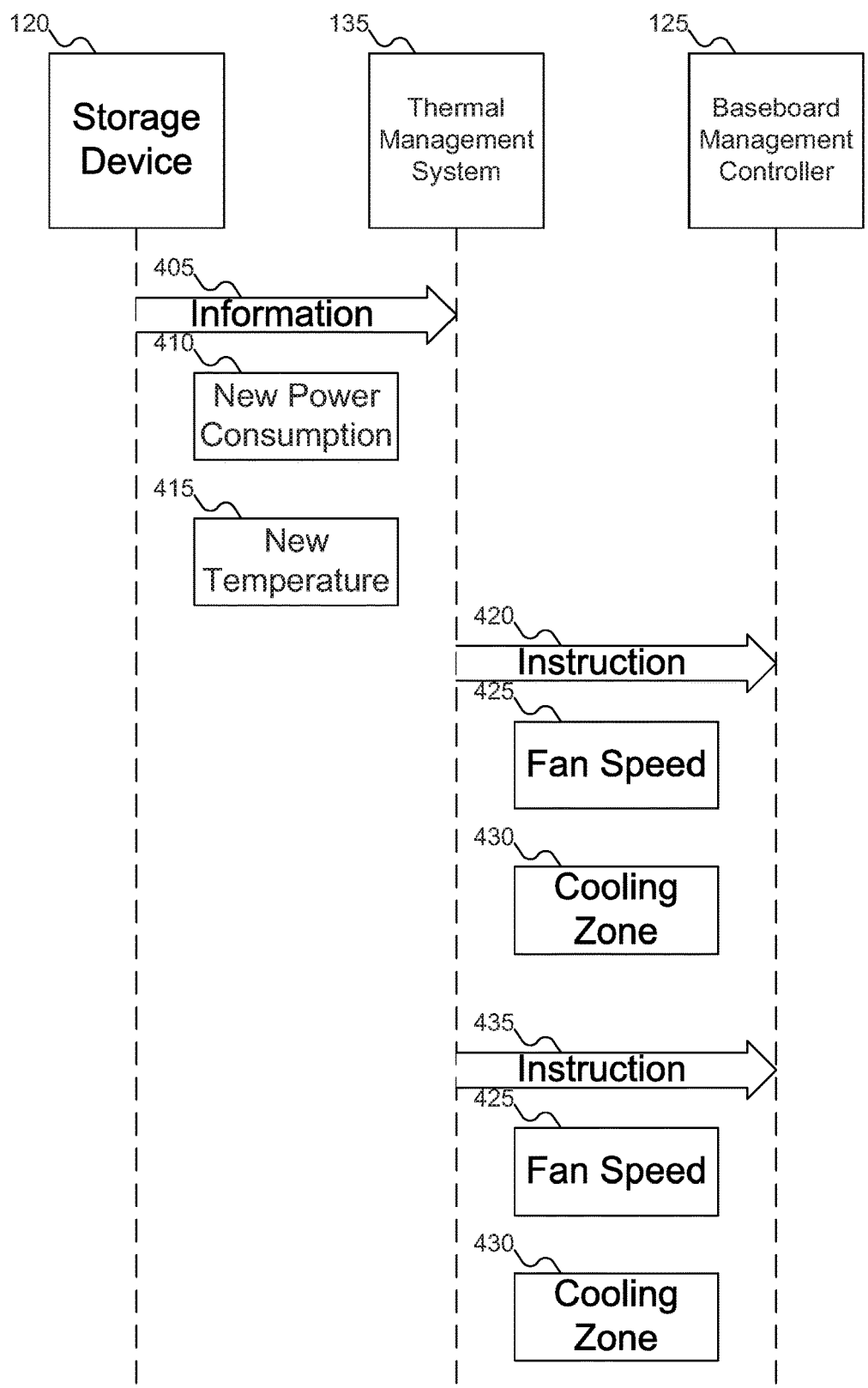
FIG. 4 shows an alternative view of the flow of information between the storage device, Baseboard Management Controller (BMC), and Intelligent Platform Management Interface (IPMI) of FIG. 1.

FIG. 4 shows an alternative view of the flow of information between the storage device, Baseboard Management Controller (BMC), and Intelligent Platform Management Interface (IPMI) of FIG. 1. For simplicity, components that act as little more than conduits for information, such as driver 320 of FIG. 3 and IPMI 130 of FIG. 1, are omitted from FIG. 4. In FIG. 4, when storage device 120 determines that an operating condition has or is about to change, storage device 120 may send information 405 to TMS 135. Information 405 may include, among other data, new (either predicted or detected) power consumption 410 and/or new temperature 415. Other data that may be included with information 405 may include, for example, a duration for which the new operating condition is expected to last, a cooling zone that includes storage device 120, and the specific changes to be made to the cooling mechanism.

Once TMS 135 receives information 405, TMS 135 may determine exactly what information needs to be provided to BMC 125. If storage device 120 has provided the relevant information—for example, if storage device 120 includes thermal profile 325 of FIG. 3—then TMS 135 might be able to simply forward the pertinent information to BMC 125. But if storage device 120 has not provided all the pertinent information, such as the cooling zone including storage device 120 or how the cooling system is to be adjusted, TMS 135 might need to determine this information for itself. For example, in some embodiments of the inventive concept, storage device 120 might not know in which cooling zone it is located, or exactly how the cooling system needs to be adjusted to address the new operating condition. In such an embodiment of the inventive concept, storage device 120 might only provide the new operating condition to TMS 135. TMS 135 may use the data provided by storage device 120 and access what changes need to be made to the cooling system. Specifically, TMS 135 may access thermal profile 325 of FIG. 3 to retrieve the appropriate adjustments to make to the cooling system, as the new operating condition may be matched with some thermal profile.

Once TMS 135 has the appropriate information regarding how the cooling system should be adjusted, TMS 135 may send instruction 420 to BMC 125. Instruction 420 may include fan speed 425 and cooling zone 430, letting BMC 125 know precisely what changes storage device 120 needs made to the cooling system. BMC 125 may receive instruction 420 and then make the appropriate changes to the cooling system, thereby ensuring that storage device 120 continues to operate in optimal thermal conditions (barring a failure of the cooling system).

In some embodiments of the inventive concept, instruction 420 may also include a duration, letting BMC 125 know how long storage device 120 needs the cooling system to maintain the specified parameters. Once this duration has elapsed, BMC 125 may automatically return to its more conventional processing, determining what fan speeds to maintain based on sensors 340 through 345 of FIG. 3 in combination with whatever fan speeds are required by storage device 120 in its default cooling state.

In other embodiments of the inventive concept, TMS 135 may monitor how long to maintain the adjustments to the cooling system. These embodiments of the inventive concept may cover situations where BMC 125 does not support an internal timing of a change to the cooling system. These embodiments of the inventive concept may also provide for a simpler implementation of TMS 135, since TMS 135 would not need to be designed to support both types of BMCs. In such embodiments of the inventive concept, after the determined duration has elapsed, TMS 135 may send a second instruction 435 to BMC 135. This second instruction 435 may specify a new fan speed 425 for a particular cooling zone 430, restoring the cooling system to its "default" operating condition (at least with respect to storage device 120).

It is worth noting that storage device 120 may send information 405 to TMS 135 even where the cooling system is already providing adequate cooling for storage device 120. For example, consider the following scenario. Processor 110 of FIG. 1 has been performing a computation-intensive task. As a result, BMC 135 has set the cooling system to operate at high speed, to keep processor 110 of FIG. 1 adequately cooled. As a consequence, storage device 120 is currently being cooled sufficiently for its idle state (in which storage device 120 is drawing 6 watts). Then, storage device 120 receives requests to perform significant input/output, requiring storage device to begin drawing 9 watts. Again, the cooling system is currently sufficient to keep storage device 120 cool. It is at this point that storage device 120 would send information 405 to TMS 135, which would send instruction 420 to BMC 135.

Assume that storage device 120 did not send information 405, relying on the fact that the cooling system at the current time is adequate. Further assume that while storage device 120 is performing the input/output operations, processor 110 of FIG. 1 ends its computation-intensive tasks. But when processor 110 of FIG. 1 ends its computation-intensive tasks, BMC 135 (via sensors 340 through 345 of FIG. 3) would reduce the operation of the cooling system. As a result, storage device 120 might now no longer be adequately cooled for its input/output operations. This condition could lead to data loss and performance degradation.

There are two solutions to this problem, and both involve storage device 120 requesting BMC 125 to adjust the cooling system. One solution is for storage device 120 to detect increased temperature (for example, using thermal sensor 305 of FIG. 3) and request that the cooling system be increased. (Note that this scenario explains why it may be useful for storage device 120 to include both thermal sensor 305 of FIG. 3 and power-related sensors, such as wattmeter 310 of FIG. 3 and power predictor 315 of FIG. 3.) The other solution is for storage device 120 to request BMC 125 to adjust the cooling system when storage device 120 determines a need for cooling, even before storage device 120 has begun to heat up. By requesting that BMC 125 maintain a target cooling, even when the cooling system is already providing that much (or more) cooling, may avoid BMC 125 having to decrease cooling and shortly thereafter increasing it again: BMC 125 may simply ensure that the cooling system is providing sufficient cooling for both processor 110 of FIG. 1 (as determined via sensors 340 through 345 of FIG. 3) and for storage device 120 (whose cooling requirements BMC 125 might not directly determine). This does, of course, require that BMC 125 track a minimum cooling based on both sensors 340 through 345 of FIG. 3 and storage device 120.

In a similar vein, sensors 340 through 345 of FIG. 3 might indicate that the cooling system is more than adequate for processor 110 of FIG. 1 (and therefore that BMC 125 could reduce the cooling). But if storage device 120 has requested additional cooling for its own reasons, BMC 125 should maintain a higher rate of cooling until both storage device 120 and processor 110 of FIG. 1 indicate that a lower rate of cooling will be sufficient.

Figure 5:
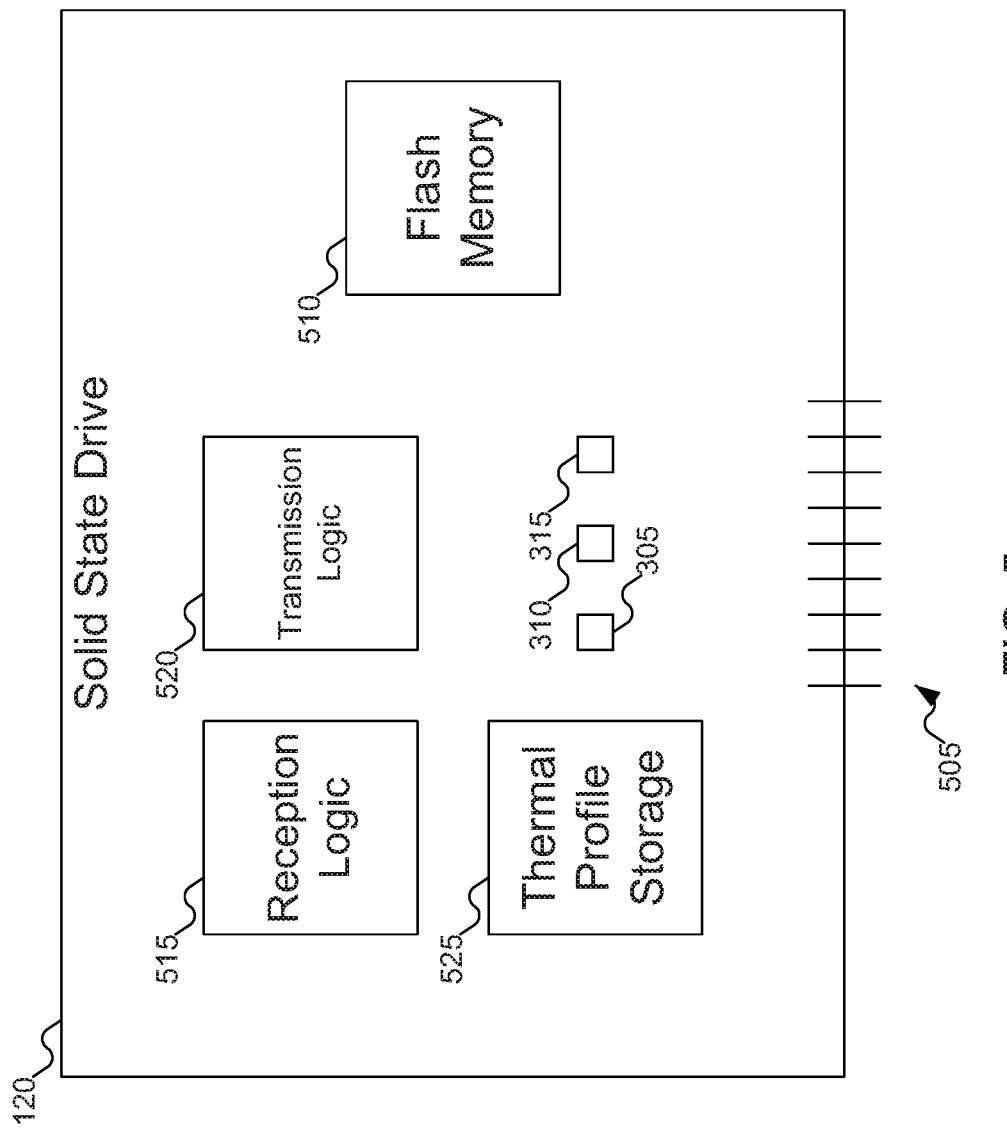
FIG. 5 shows details of a Solid State Drive (SSD) as the storage device of FIG. 1.

FIG. 5 shows details of a Solid State Drive (SSD) as storage device 120 of FIG. 1. While FIG. 5 shows storage device 120 as an SSD, similar components may be introduced into other storage device form factors without loss of functionality. SSD 120 may include circuitry 505 to couple SSD 120 to a socket on a motherboard of server 105 of FIG. 1. In other embodiments of the inventive concept, circuitry 505 may be replaced with other mechanisms to interface SSD 120 with other components of server 105 of FIG. 1. SSD 120 may also include flash memory 510, which may be NAND flash memory, to store data.

SSD 120 may also include reception logic 515, transmission logic 520, thermal profile storage 525, and sensors 305, 310, and 315. Reception logic 515 and transmission logic 520 may be used to receive and transmit data. For example, transmission logic 520 may be used to send information 405 of FIG. 4 to TMS 135 of FIG. 1. Thermal profile storage 525 may store thermal profiles, such as thermal profile 325 of FIG. 3, which SSD 120 may use to determine the appropriate cooling requirements (such as fan speed) when SSD 120 is operating at particular operating conditions.

Although not shown in FIG. 5, SSD 120 may also include an SSD controller, which may include reception logic 515, transmission logic 520, and/or thermal profile storage 525.

Figure 6:
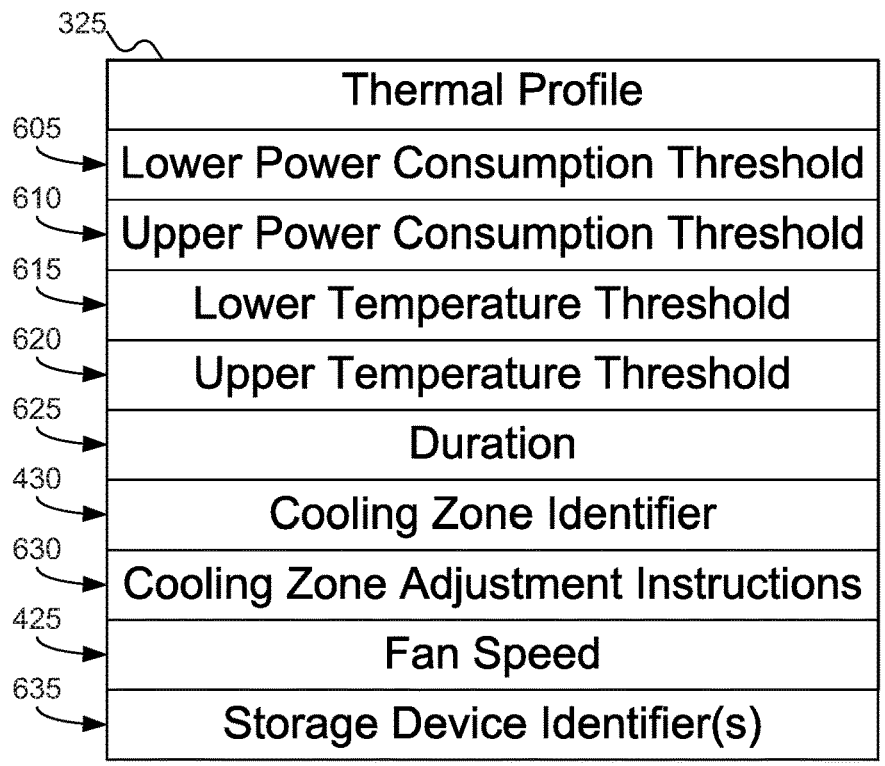
FIG. 6 shows details of a thermal profile, according to an embodiment of the inventive concept.

FIG. 6 shows details of thermal profile 325 of FIG. 3, according to an embodiment of the inventive concept. In FIG. 6, thermal profile 325 may include lower and upper lower and upper thresholds that define a range for the thermal profile. These thresholds may be for power consumption, temperature, or any other desired operating condition that may be correlated with temperature for storage device 120 of FIG. 1. Thus, for example, thermal profile 325 may include lower power consumption threshold 605 and upper power consumption threshold 610, or lower temperature threshold 615 and upper temperature threshold 620. Thermal profile 325 may include any number of different thresholds for different operating conditions. For example, thermal profile 325 may include all of lower power consumption threshold 605, upper power consumption threshold 610, lower temperature threshold 615, and upper temperature threshold 620. The thresholds may define ranges each with different cooling requirements. For example, recall above that a storage device might operate at three different power levels: 6 watts, 9 watts, and 12 watts, each requiring different levels of cooling. Three different thermal profiles may cover these three cases, defining ranges of, for example, 4.5-7.5 watts, 7.5-10.5 watts, and 10.5-13.5 watts. (Since the power consumption of the storage device is likely a stepwise function, it is unlikely that the storage device would demand power at the common point between pairs of ranges. But using ranges protects against the possibility that the power consumption is not an exact multiple of a number of watts.)

Including thresholds for multiple different operating conditions may be useful in situations where different triggers might be used for adjusting the cooling system. As described above, storage device 120 of FIG. 1 might normally use power consumption to determine when to adjust the cooling system. But if the cooling system is already providing adequate cooling based on the needs of processor 110 of FIG. 1, storage device 120 of FIG. 1 might fall back on temperature rather than preemptively request BMC 125 of FIG. 1 to continue the cooling for some duration. But using a single thermal profile with multiple ranges for different operating conditions is functionally equivalent to using multiple thermal profiles, each with a range for a different operating condition.

Aside from the various thresholds, thermal profile 325 may include duration 625. Duration 625 may specify how long the cooling system is to be adjusted for storage device 120 of FIG. 1 (but the cooling system may provide greater cooling if processor 110 of FIG. 1 needs it). As described above with reference to FIG. 4, either BMC 125 of FIG. 1 or TMS 135 of FIG. 1 may measure duration 625, after which the cooling system may switch back to managing cooling based on sensors 340 through 345 of FIG. 3.

Thermal profile 325 may also include cooling zone identifier 430. As discussed above with reference to FIG. 4, cooling zone identifier 430 may identify the cooling zone that governs storage device 120 of FIG. 1.

Thermal profile 325 may also include cooling zone adjustment instructions 630. Cooling zone adjustment instructions 630 may specify how the cooling system should be adjusted to achieve the level of cooling desired by storage device 120 of FIG. 1. For example, cooling zone adjustment instructions 630 may include fan speed 425.

Finally, thermal profile 325 may also include storage device identifiers 635. Since a single thermal profile might be usable to manage the cooling system for multiple storage devices, storage device identifiers 635 may identify which storage devices are governed by thermal profile 325. Of course, for thermal profile 325 to govern more than one storage device, all the storage devices governed by thermal profile 325 need to use the same field values: the same thresholds, durations, cooling zone, and cooling zone adjust instructions (to the extent these fields are included in thermal profile 325). So if there are multiple storage devices in the same cooling zone but needing different field values, the storage devices may use different thermal profiles. For example, consider two storage devices in the same cooling zone and of identical manufacture and model. If the two storage devices are placed at different distances from the fan governing their cooling zone, they might require different fan speeds to keep them cool under identical power loads. The storage device closer to the fan might require a lower fan speed than the storage device further from the fan to keep each operating within their thermal conditions. Therefore, the storage devices may use different profiles to reflect their different cooling zone adjustments.

As might be expected from the above discussion, a single storage device may have several different thermal profiles that govern it. One of these thermal profiles may be designated as the default profile. The default profile may specify the target cooling requirements for whatever operating conditions are considered the default for the storage device. The default operating conditions may, for example, include the lowest, or average, power consumption requirements for the storage device. Other profiles may be termed "desired profile", as they are desired at different points of time during the operation of the storage device.

Figure 7:
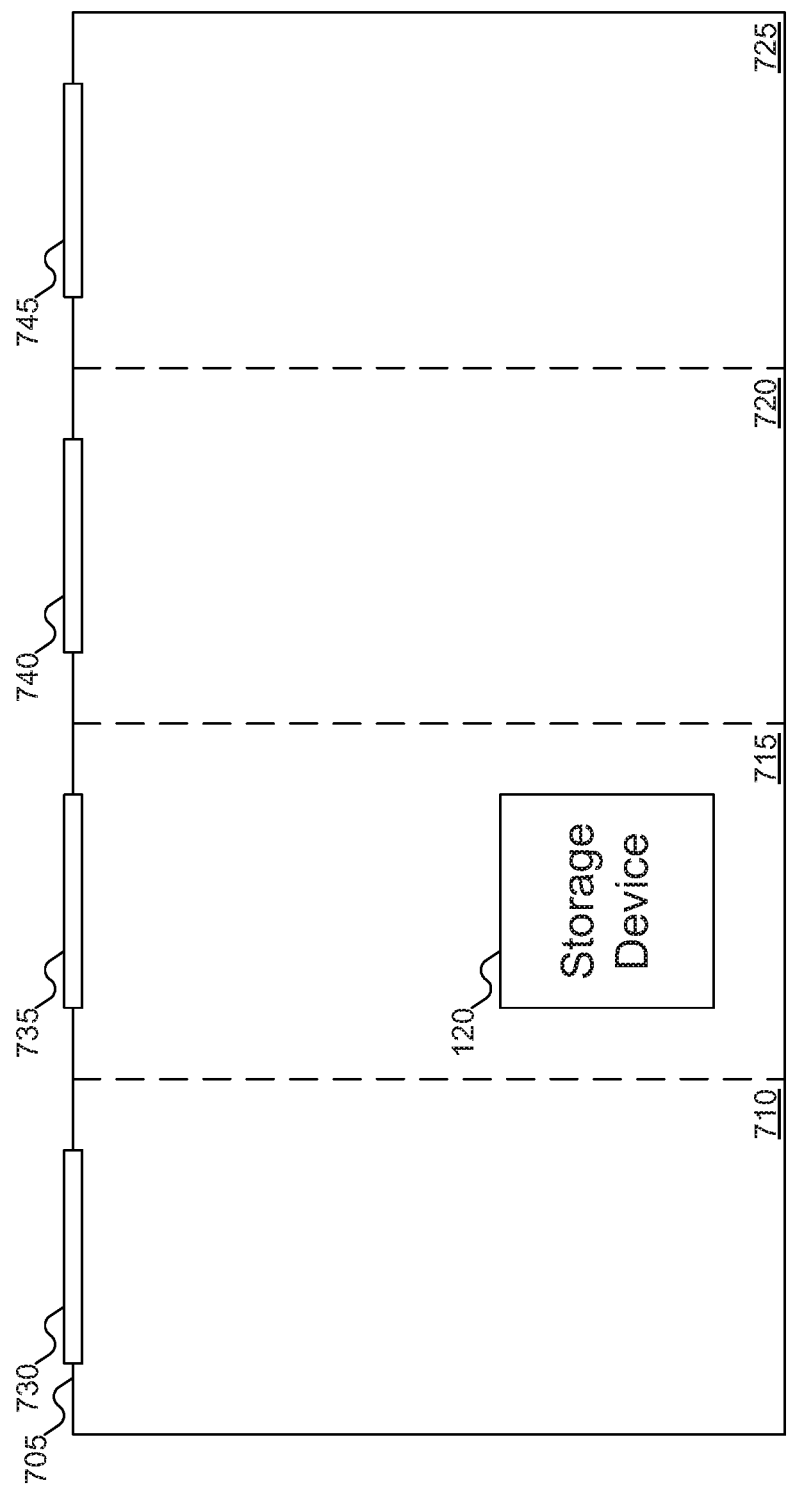
FIG. 7 shows an example baseboard divided into cooling zones.

FIG. 7 shows an example baseboard divided into cooling zones. In FIG. 7, baseboard 705 is shown. Baseboard 705 may be divided into four cooling zones 710, 715, 720, and 725. These cooling zones are cooled by fans 730, 735, 740, and 745, respectively. When storage device 120, situated in cooling zone 715, requires cooling, BMC 125 of FIG. 1 may adjust the speed of fan 735. When storage device 120 no longer requires additional cooling, BMC 125 may restore fan 735 to its original speed.

FIG. 7 shows baseboard 705 divided into four cooling zones, each cooled by a single fan. But other embodiments of the inventive concept may support any number of cooling zones and any number of fans cooling each cooling zone, as well as fans that may cool multiple cooling zones. In addition, embodiments of the inventive concept may support cooling systems other than fans 730, 735, 740, and 745: for example, liquid cooling systems. And while FIG. 7 shows cooling zones that are rectangular in shape, embodiments of the inventive concept may support cooling zones of any shape, as the cooling zones (and the cooling systems that affect them) are determined by the physical layout of baseboard 705.

Figure 8:
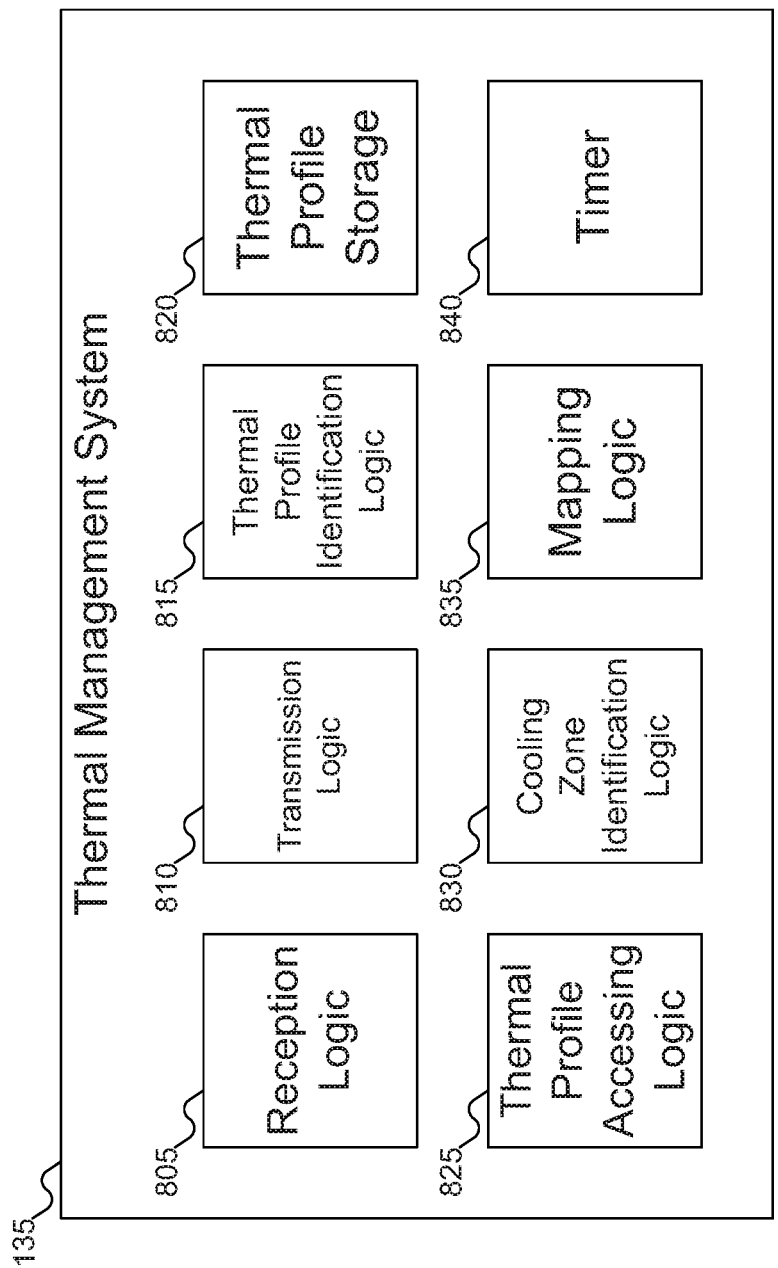
FIG. 8 shows details of the Thermal Management System (TMS) of FIG. 1.

FIG. 8 shows details of TMS 135 of FIG. 1. In FIG. 8, TMS 135 may include reception logic 805 and transmission logic 810, which may manage the receiving and sending of information. TMS 135 may also include thermal profile identification logic 815, thermal profile storage 820, and thermal profile accessing logic 825. Thermal profile identification logic 815 may identify a desired thermal profile, stored in thermal profile storage 820, appropriate to the operating conditions of storage device 120 of FIG. 1. Thermal profile accessing logic 825 may access information from a selected thermal profile.

TMS 135 may also include cooling zone identification logic 830. Cooling zone identification logic 830 may identify the cooling zone in which a particular storage device is located. For example, cooling zone identification logic 830 may access cooling zone information from thermal profile 325 of FIG. 3.

TMS 135 may also include mapping logic 835. Mapping logic 835 may map between different operating conditions for storage device 120 of FIG. 1. For example, given a particular power consumption for storage device 120 of FIG. 1, mapping logic 835 may map the power consumption to a temperature. Mapping logic 835 may be useful in situations where thermal profile 325 of FIG. 3 stores lower and upper thresholds using one operating condition, such as temperature, but storage device 120 of FIG. 1 reports a different operating condition, such as power consumption.

Finally, TMS 135 may include timer 840. As described above with reference to FIG. 4, TMS might be responsible for measuring duration 625 of FIG. 6, after which TMS 135 should instruct BMC 125 of FIG. 1 to adjust the cooling system to the default cooling for storage device 120 of FIG. 1. TMS 135 may use timer 840 to determine when duration 625 of FIG. 6 has passed.

While FIG. 8 shows TMS 135 implemented in hardware using circuitry logic, other embodiments of the inventive concept may implement TMS 135 in other ways. For example, TMS 135 may be implemented using just software or with a combination of software and hardware.

Figure 9:
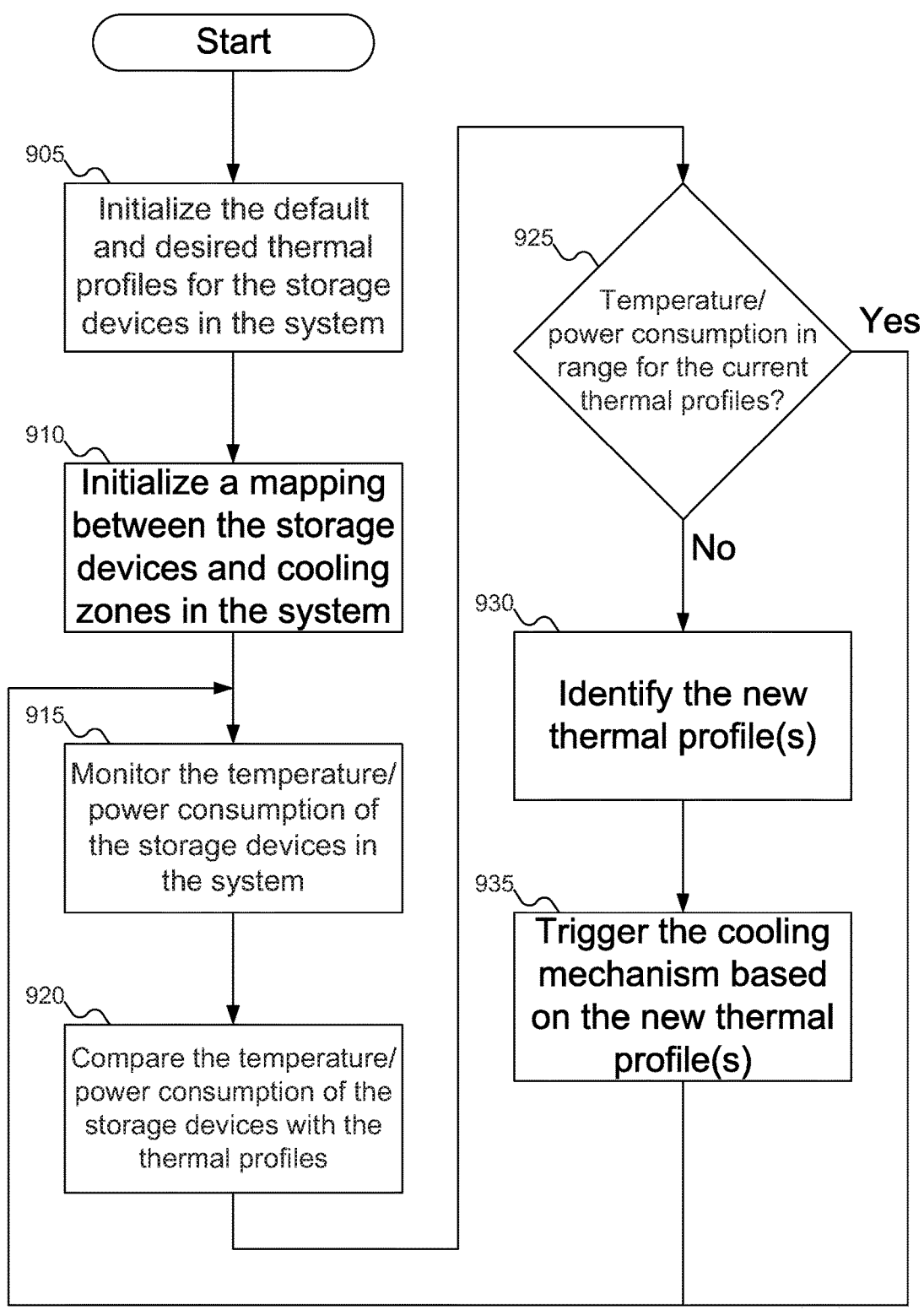
FIG. 9 shows an example of a high-level flowchart for using the TMS of FIG. 1, according to an embodiment of the inventive concept.

FIG. 9 shows an example of a high-level flowchart for using TMS 135 of FIG. 1, according to an embodiment of the inventive concept. In FIG. 9, at block 905, TMS 135 may initialize the default and desired thermal profiles 325 of FIG. 3 for storage devices 120 of FIG. 1. At block 910, TMS 135 may initialize a mapping between storage devices 120 of FIG. 1 and cooling zone 710, 715, 720, and 725 of FIG. 7. At block 915, TMS 135 may monitor the temperature, power consumption, or any related metric of storage devices 120 of FIG. 1. At block 920, TMS 135 may compare the temperature, power consumption, or other related metric of storage devices 120 of FIG. 1 against the thresholds in thermal profiles 325 of FIG. 3.

At block 925, TMS 135 may determine if the temperature, power consumption, or other related metric of storage devices 120 of FIG. 1 are still within the range of the current thermal profiles 325 of FIG. 3. If not, then at block 930, TMS 135 may identify the new thermal profile(s) 325 of FIG. 3 that govern the metric for storage devices 120 of FIG. 1, and at block 935 TMS 135 may instruct BMC 125 of FIG. 1 to trigger the cooling system(s) to the levels appropriate for the new thermal profile(s) 325 of FIG. 3. Then, whether or not TMS 135 determined that the metrics for storage devices 120 of FIG. 1 were within range of thermal profiles 325, processing may return to block 915 for TMS 135 to check again whether any adjustments are needed to the cooling system.

Figure 10:
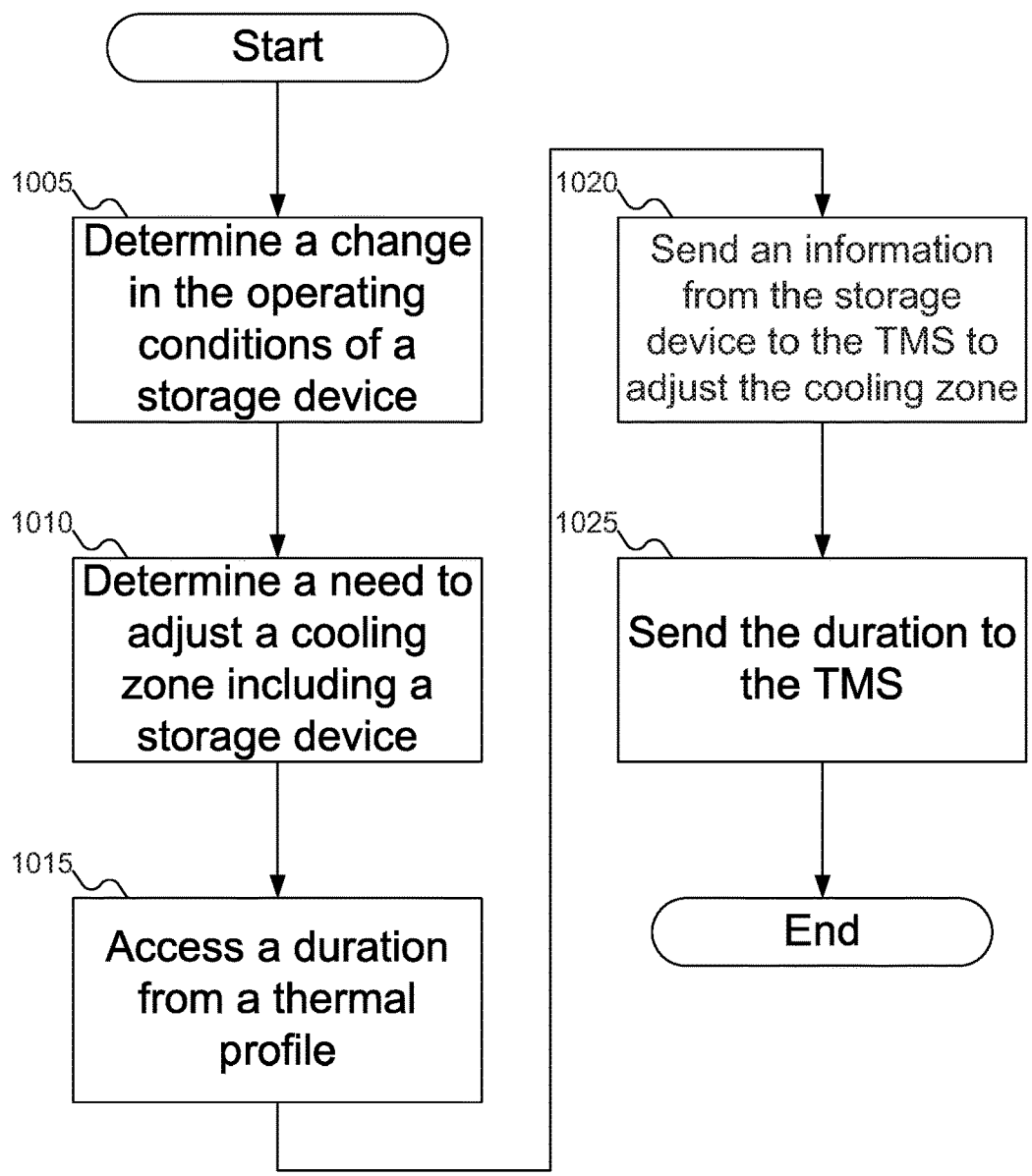
FIG. 10 shows an example flowchart of a procedure for the storage device of FIG. 1 to affect the cooling system in the server of FIG. 1, according to an embodiment of the inventive concept.

FIG. 10 shows an example flowchart of a procedure for storage device 120 of FIG. 1 to affect the cooling system in server 105 of FIG. 1, according to an embodiment of the inventive concept. In FIG. 10, at block 1005, storage device 120 of FIG. 1 may determine that a change in the operating conditions of storage device 120 of FIG. 1 has occurred. For example, storage device 120 may receive information from one of sensors 305, 310, and/or 315 that the operating condition has changed. At block 1010, storage device 120 of FIG. 1 may determine that a need exists to change the cooling in cooling zone 715 of FIG. 7 including storage device 120 of FIG. 1. Note that a change in the operating condition of storage device 120 of FIG. 1 does not automatically imply the need to change the cooling in cooling zone 715 of FIG. 7. For example, the thresholds of thermal profile 325 of FIG. 3 might be set such that the change in the operating conditions of storage device 120 of FIG. 1 is still within the range of those thresholds.

Assuming that a change in the cooling of cooling zone 715 of FIG. 7 including storage device 120 of FIG. 1 is needed, at block 1015 storage device 120 of FIG. 1 may access the duration 625 of FIG. 6 of the change from thermal profile 325. At block 1020, storage device 120 of FIG. 1 may then send information 405 to TMS 135 of FIG. 1 about the need to adjust the cooling in cooling zone 715 of FIG. 7 including storage device 120 of FIG. 1. Finally, at block 1025, storage device 120 of FIG. 1 may send duration 625 of FIG. 6 to TMS 135 of FIG. 1.

FIG. 10 describes the operation of storage device 120 of FIG. 1 with a broad possible scope of operations. But embodiments of the inventive concept may include a reduced scope for storage device 120 of FIG. 1. For example, storage device 120 of FIG. 1 might not store thermal profile 325, which could be stored instead within TMS 135 of FIG. 1. In that case, storage device 120 of FIG. 1 would not be able to definitively determine whether a need exists to change adjust the cooling in cooling zone 715 of FIG. 7 including storage device 120 of FIG. 1, as described in block 1010. But as the change in the operating conditions would imply the need to adjust the cooling in cooling zone 715 of FIG. 7 including storage device 120 of FIG. 1, storage device 120 of FIG. 1 could infer in block 1010 that a need to change the cooling of cooling zone 715 of FIG. 7 including storage device 120 of FIG. 1 exists. Instead, storage device 120 of FIG. 1 would send the new operating conditions to TMS 135 of FIG. 1, and leave it up to TMS 135 of FIG. 1 to determine whether a need exists to change the cooling in cooling zone 715 of FIG. 7 including storage device 120 of FIG. 1.

For similar reasons, storage device 120 of FIG. 1 would not access duration 625 of FIG. 6 from thermal profile 325 of FIG. 3, since storage device 120 of FIG. 1 would not have access to thermal profile 325 of FIG. 3. Additionally, storage device 120 of FIG. 1 would not send duration 625 of FIG. 6 to TMS 135 of FIG. 1.

Figure 11:
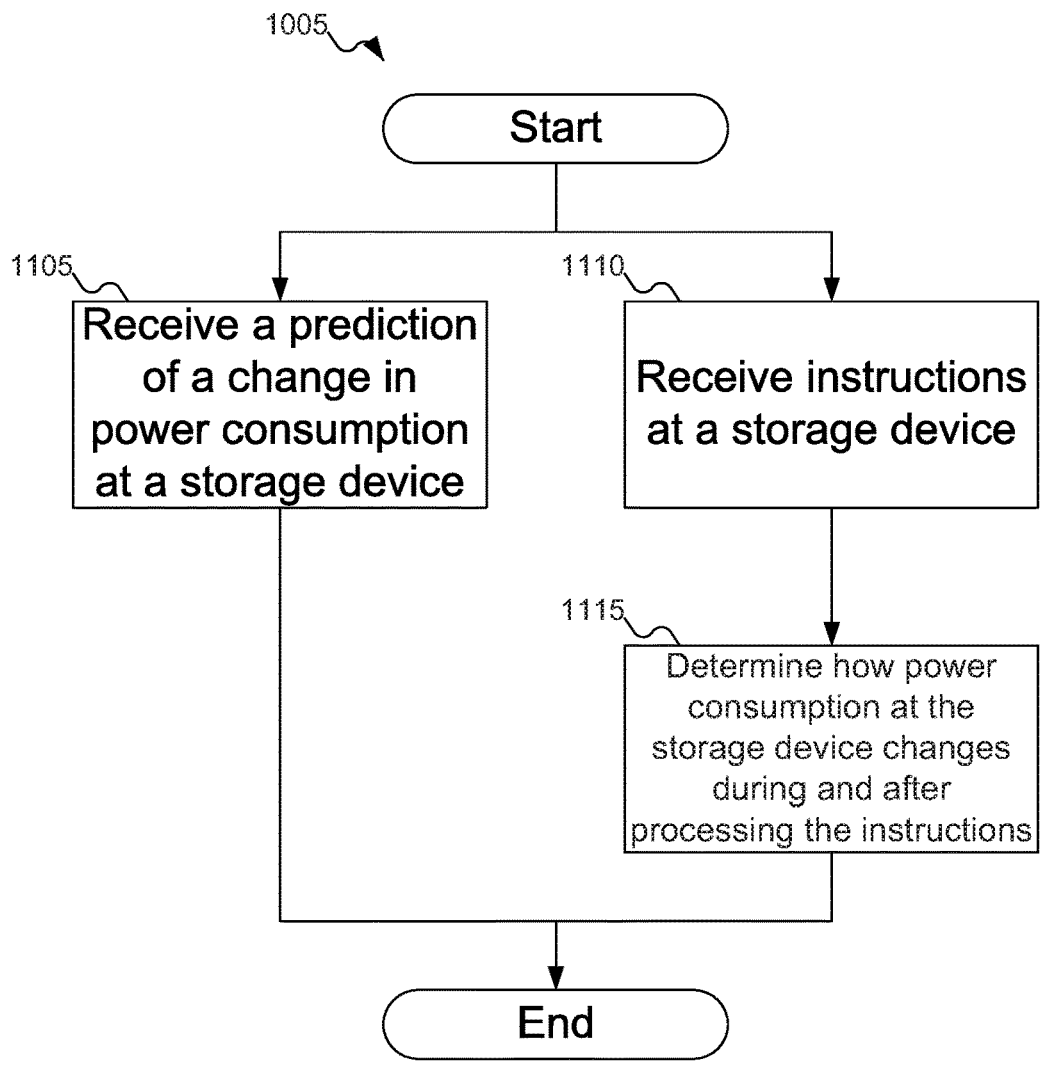
FIG. 11 shows an example flowchart of a procedure for the storage device of FIG. 1 to determine a change in its operating conditions, according to an embodiment of the inventive concept.

FIG. 11 shows an example flowchart of a procedure for storage device 120 of FIG. 1 to determine a change in its operating conditions, according to an embodiment of the inventive concept. In FIG. 11, at block 1105, storage device 120 of FIG. 1 may receive data from power predictor 315 of FIG. 3 about a predicted change in power consumption at storage device 120 of FIG. 1. Alternatively, at block 1110, storage device 120 of FIG. 1 may receive instructions, which may be read or write instructions, instructions to perform in-storage computing, or some other variety of instruction. Finally, at block 1115 wattmeter 310 of FIG. 3 may determine a change in power consumption at storage device 120 of FIG. 1 responsive to the received instructions and after storage device 120 of FIG. 1 has processed the instructions.

Figure 12:
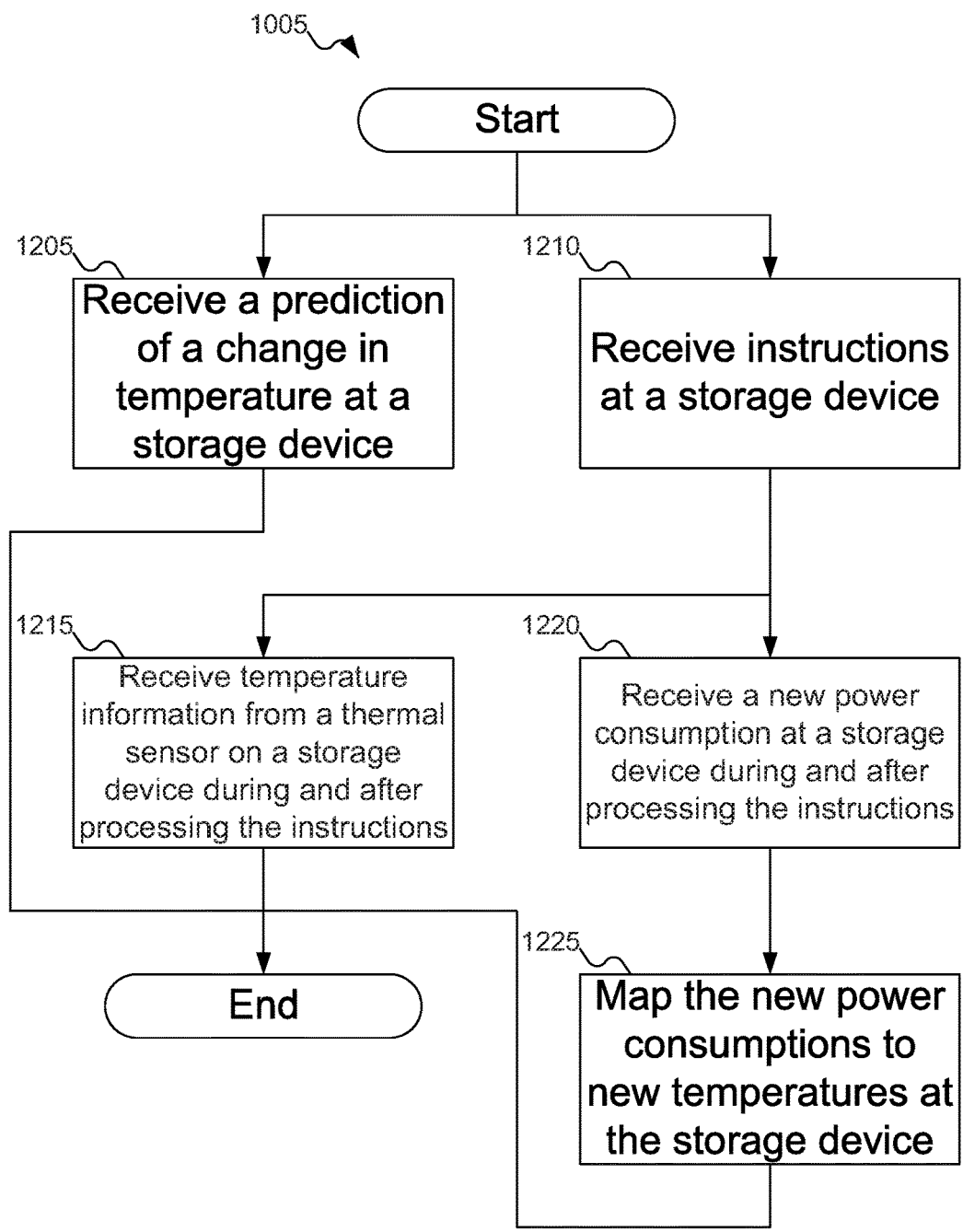
FIG. 12 shows another example flowchart of a procedure for the storage device of FIG. 1 to determine a change in its operating conditions, according to another embodiment of the inventive concept.

FIG. 12 shows another example flowchart of a procedure for storage device 120 of FIG. 1 to determine a change in its operating conditions, according to another embodiment of the inventive concept. In FIG. 12, at block 1205, storage device 120 of FIG. 1 may receive data from power predictor 315 of FIG. 3 about a predicted change in temperature at storage device 120 of FIG. 1. Alternatively, at block 1210, storage device 120 of FIG. 1 may receive instructions, which may be read or write instructions, instructions to perform in-storage computing, or some other variety of instruction. Then, at block 1215, thermal sensor 305 of FIG. 3 may determine a change in temperature at storage device 120 of FIG. 1. Or, at block 1220, wattmeter 310 of FIG. 3 may determine a change in power consumption at storage device 120 of FIG. 1, and at block 1225, storage device 120 of FIG. 1 may map those new power consumptions to new temperatures.

Figure 13:
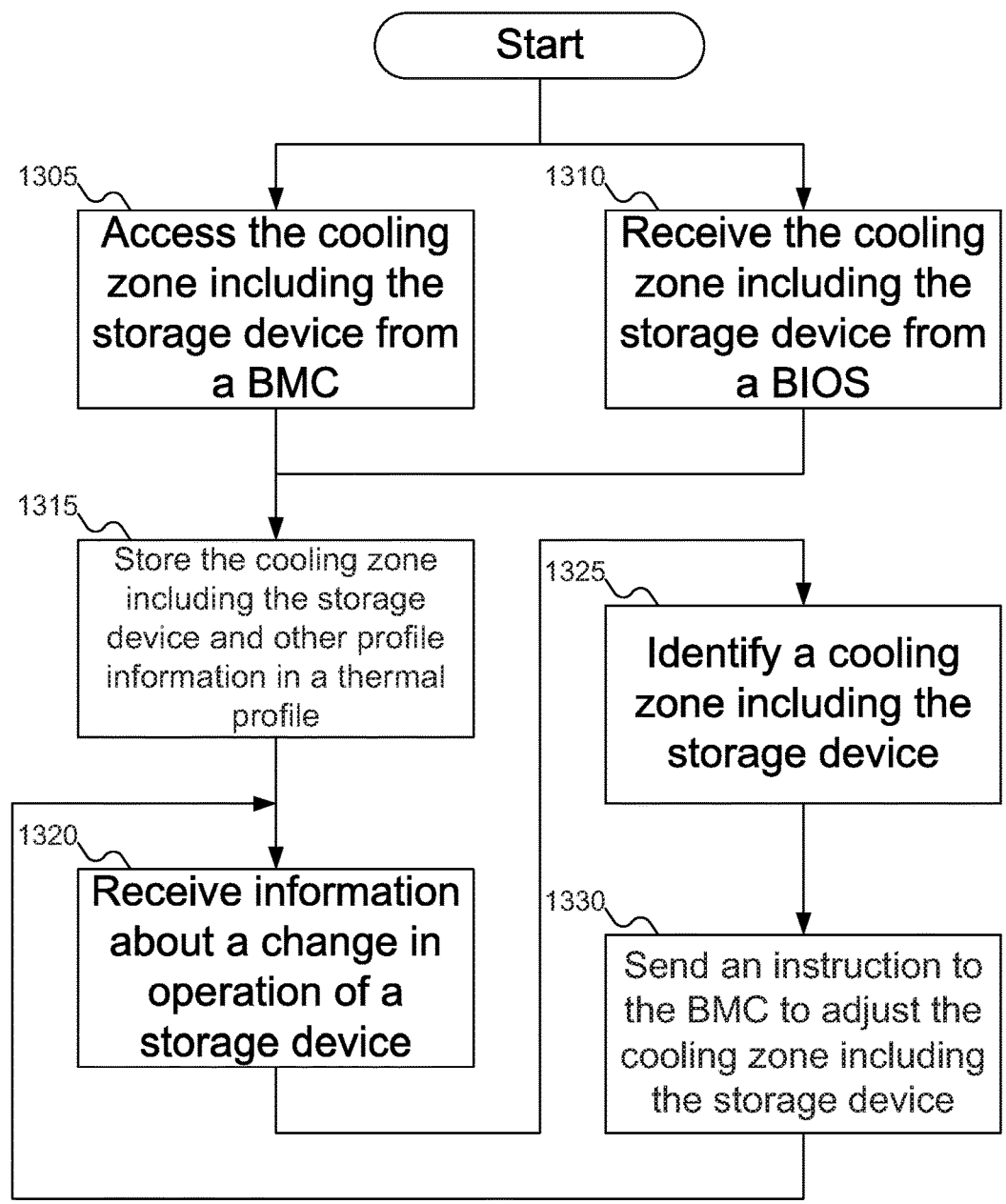
FIG. 13 shows an example flowchart of a procedure for the TMS of FIG. 1 to instruct the BMC of FIG. 1 to adjust the cooling mechanism of the server of FIG. 1, according to an embodiment of the inventive concept.

FIG. 13 shows an example flowchart of a procedure for TMS 135 of FIG. 1 to instruct BMC 125 of FIG. 1 to adjust the cooling system of server 105 of FIG. 1, according to an embodiment of the inventive concept. In FIG. 13, at block 1305, TMS 135 of FIG. 1 may access information about which cooling zones 710, 715, 720, and 725 of FIG. 7 include storage devices 120 of FIG. 1. Alternatively, at block 1310 a BIOS on server 105 of FIG. 1 may provide information to TMS 135 of FIG. 1 about which cooling zones 710, 715, 720, and 725 of FIG. 7 include storage devices 120 of FIG. 1, just as the BIOS may provide that information to BMC 125 of FIG. 1.

Regardless of how TMS 135 of FIG. 1 obtains the information about which cooling zones 710, 715, 720, and 725 of FIG. 7 include which storage devices 120 of FIG. 1, at block 1315, TMS 135 of FIG. 1 may store information about which cooling zones 710, 715, 720, and 725 of FIG. 7 include which storage devices 120 of FIG. 1 in thermal profiles 325 of FIG. 3. At block 1315, TMS 135 of FIG. 1 may also store other profile information in thermal profiles 325 of FIG. 3: for example, the thresholds applicable to thermal profiles 325 of FIG. 3, the durations for thermal profiles 325 of FIG. 3 (if known), which storage devices are governed by thermal profile 325 of FIG. 3, and what instructions 630 should be sent to BMC 125 of FIG. 1 to achieve the desired changes to the cooling system.

At block 1320, TMS 135 of FIG. 1 may receive information 405 from storage device 120 of FIG. 1 about a change in the operating conditions of storage device 120 of FIG. 1. At block 1325, TMS 135 of FIG. 1 may identify cooling zone 715 of FIG. 7 including storage device 120 of FIG. 1. At block 1330, TMS 135 of FIG. 1 may send instruction 420 of FIG. 4 to BMC 125 of FIG. 1 to adjust the cooling system governing cooling zone 715 of FIG. 7 including storage device 120 of FIG. 1. Instruction 420 may include instructions 630 on how to adjust the cooling system and identifier 430 of FIG. 4 identifying cooling zone 715 of FIG. 7 as needing to be adjusted, among other data. Processing may then return to block 1320 for TMS 135 of FIG. 1 to wait for the next indication that changes are needed to the cooling system.

Figure 14:
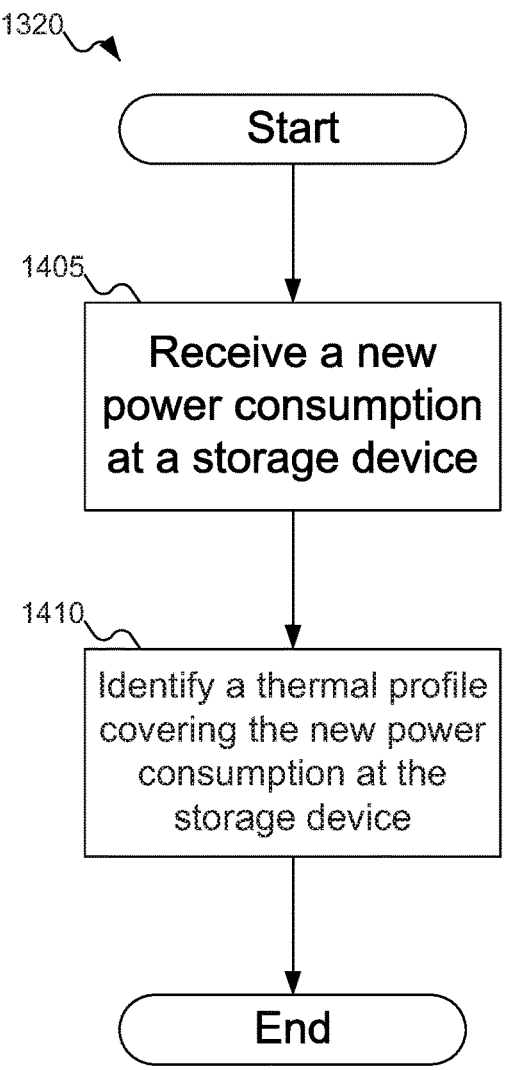
FIG. 14 shows an example flowchart of a procedure for the TMS of FIG. 1 to determine a change in the operating conditions of the storage device of FIG. 1, according to an embodiment of the inventive concept.

FIG. 14 shows an example flowchart of a procedure for TMS 135 of FIG. 1 to determine a change in the operating conditions of storage device 120 of FIG. 1, according to an embodiment of the inventive concept. In FIG. 14, at block 1405, TMS 135 of FIG. 1 may receive a new power consumption for storage device 120 of FIG. 1. At block 1410, TMS 135 of FIG. 1 may identify thermal profile 325 of FIG. 3 that includes the new power consumption within its thresholds.

Figure 15:
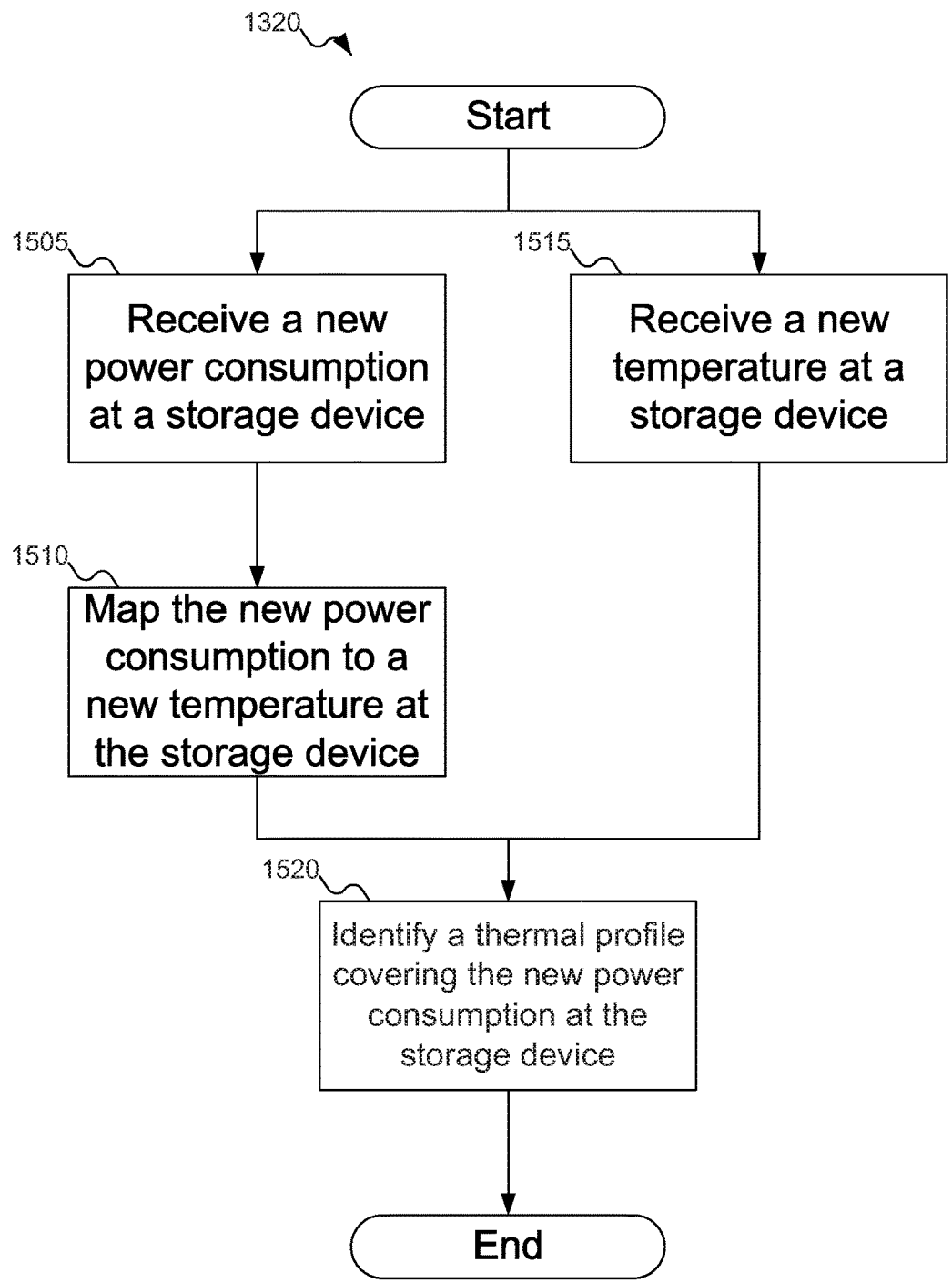
FIG. 15 shows another example flowchart of a procedure for the TMS of FIG. 1 to determine a change in the operating conditions of the storage device of FIG. 1, according to another embodiment of the inventive concept.

FIG. 15 shows another example flowchart of a procedure for TMS 135 of FIG. 1 to determine a change in the operating conditions of storage device 120 of FIG. 1, according to another embodiment of the inventive concept. In FIG. 15, at block 1505, TMS 135 of FIG. 1 may receive a new power consumption from storage device 120 of FIG. 1. At block 1510, TMS 135 of FIG. 1 may map the new power consumption to a new temperature for storage device 120 of FIG. 1. Alternatively, at block 1515, TMS 135 of FIG. 1 may receive a new temperature for storage device 120 of FIG. 1 directly from storage device 120 of FIG. 1. But regardless of how TMS 135 of FIG. 1 determines the new temperature for storage device 120 of FIG. 1, at block 1520, TMS 135 of FIG. 1 may identify thermal profile 325 of FIG. 3 that includes the new temperature within its thresholds.

Figure 16:
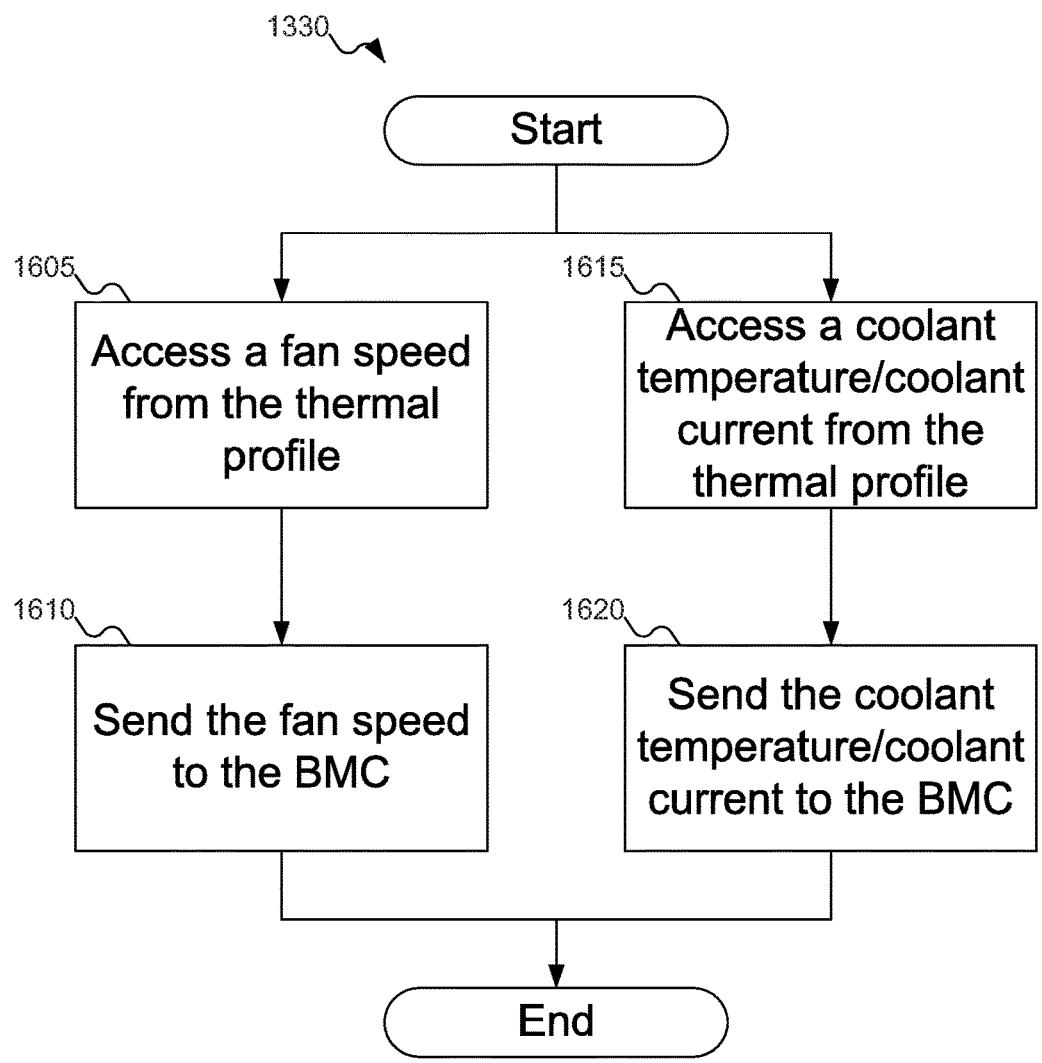
FIG. 16 shows an example flowchart of a procedure for the TMS of FIG. 1 to instruct the BMC of FIG. 1 to change the cooling system, according to an embodiment of the inventive concept.

FIG. 16 shows an example flowchart of a procedure for TMS 135 of FIG. 1 to instruct BMC 125 of FIG. 1 to change the cooling system, according to an embodiment of the inventive concept. In FIG. 16, at block 1605, TMS 135 of FIG. 1 may access fan speed 425 of FIG. 4 from thermal profile 325 of FIG. 3. At block 1610, TMS 135 of FIG. 1 may send fan speed 425 of FIG. 4 to BMC 125 of FIG. 1 as part of instruction 420 of FIG. 4.

Alternatively, at block 1615, TMS 135 of FIG. 1 may access a water or other coolant temperature and/or a water or other coolant current from thermal profile 327 of FIG. 3. At block 1620, TMS 135 of FIG. 1 may send the coolant temperature and/or the coolant current to BMC 125 of FIG. 1 as part of instruction 420 of FIG. 4.

While FIG. 16 describes TMS 135 of FIG. 1 as accessing fan speed 425 of FIG. 4 from thermal profile 325 of FIG. 3, TMS 135 of FIG. 1 may alternatively access instructions 630 of FIG. 6 regarding how to adjust the cooling system from thermal profile 325 of FIG. 3. The description in FIG. 16 of accessing fan speed 425 of FIG. 4 is merely an example of one type of instruction 630 of FIG. 6 that TMS 135 of FIG. 1 may access from thermal profile 325 of FIG. 3.

Figure 17:
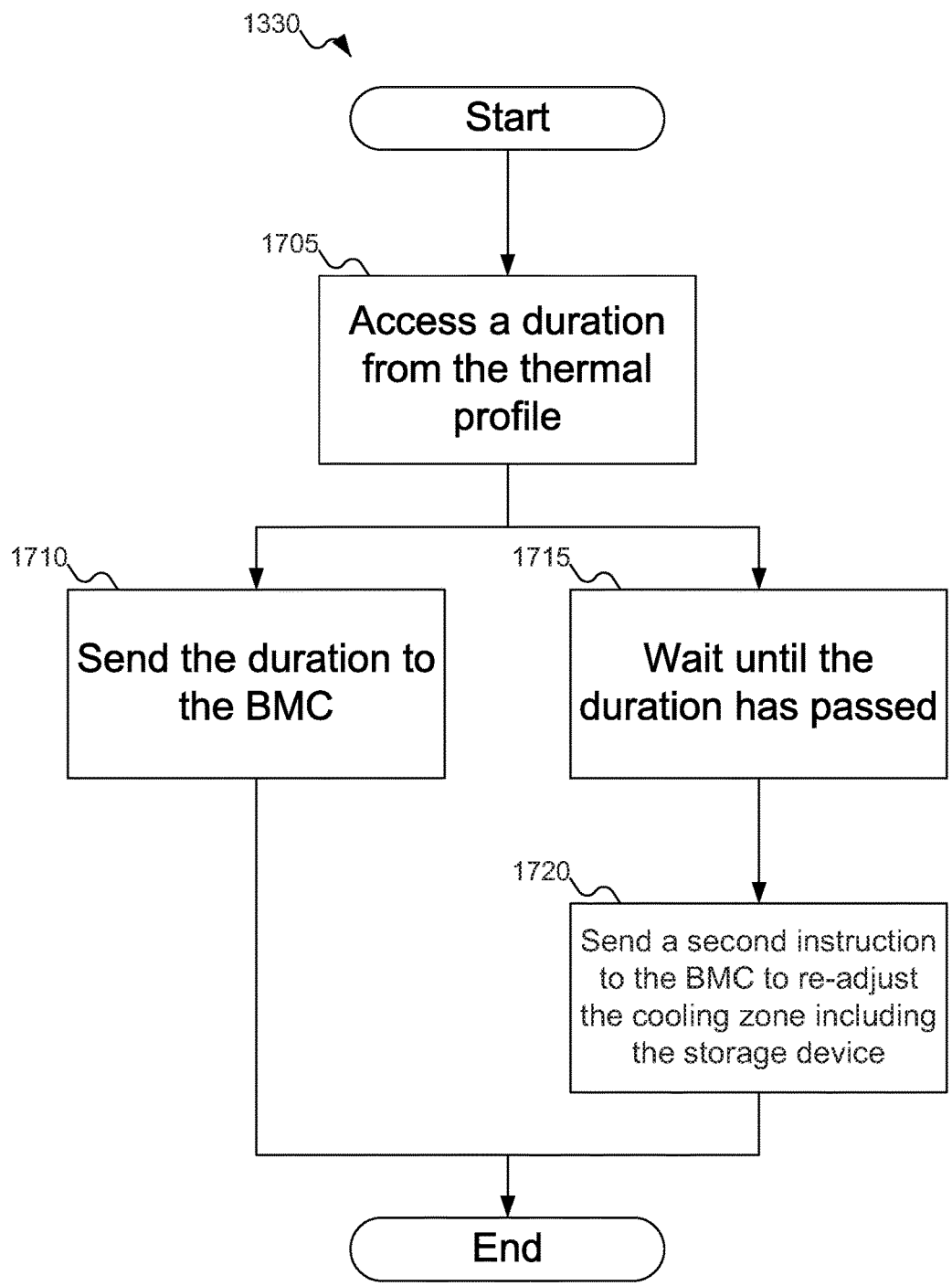
FIG. 17 shows an example flowchart of a procedure for the TMS of FIG. 1 to instruct the BMC of FIG. 1 to adjust the cooling mechanism of the server of FIG. 1 for a duration, according to an embodiment of the inventive concept.

FIG. 17 shows an example flowchart of a procedure for TMS 135 of FIG. 1 to instruct BMC 125 of FIG. 1 to adjust the cooling system of server 105 of FIG. 1 for a duration, according to an embodiment of the inventive concept. In FIG. 17, at block 1705, TMS 135 of FIG. 1 may access duration 625 of FIG. 6 from thermal profile 325 of FIG. 3. Then, at block 1710, TMS 135 of FIG. 1 may send duration 625 of FIG. 6 to BMC 125 of FIG. 1. Alternatively, at block 1715, TMS 135 of FIG. 1 may measure how much time has elapsed until duration 625 of FIG. 6 has been met, and then at block 1720, TMS 135 of FIG. 1 may send instruction 435 of FIG. 4 to BMC 125 of FIG. 1 to re-adjust the cooling system for cooling zone 715 of FIG. 7 including storage device 120 of FIG. 1, now that duration 625 of FIG. 6 has elapsed.

Figure 18:
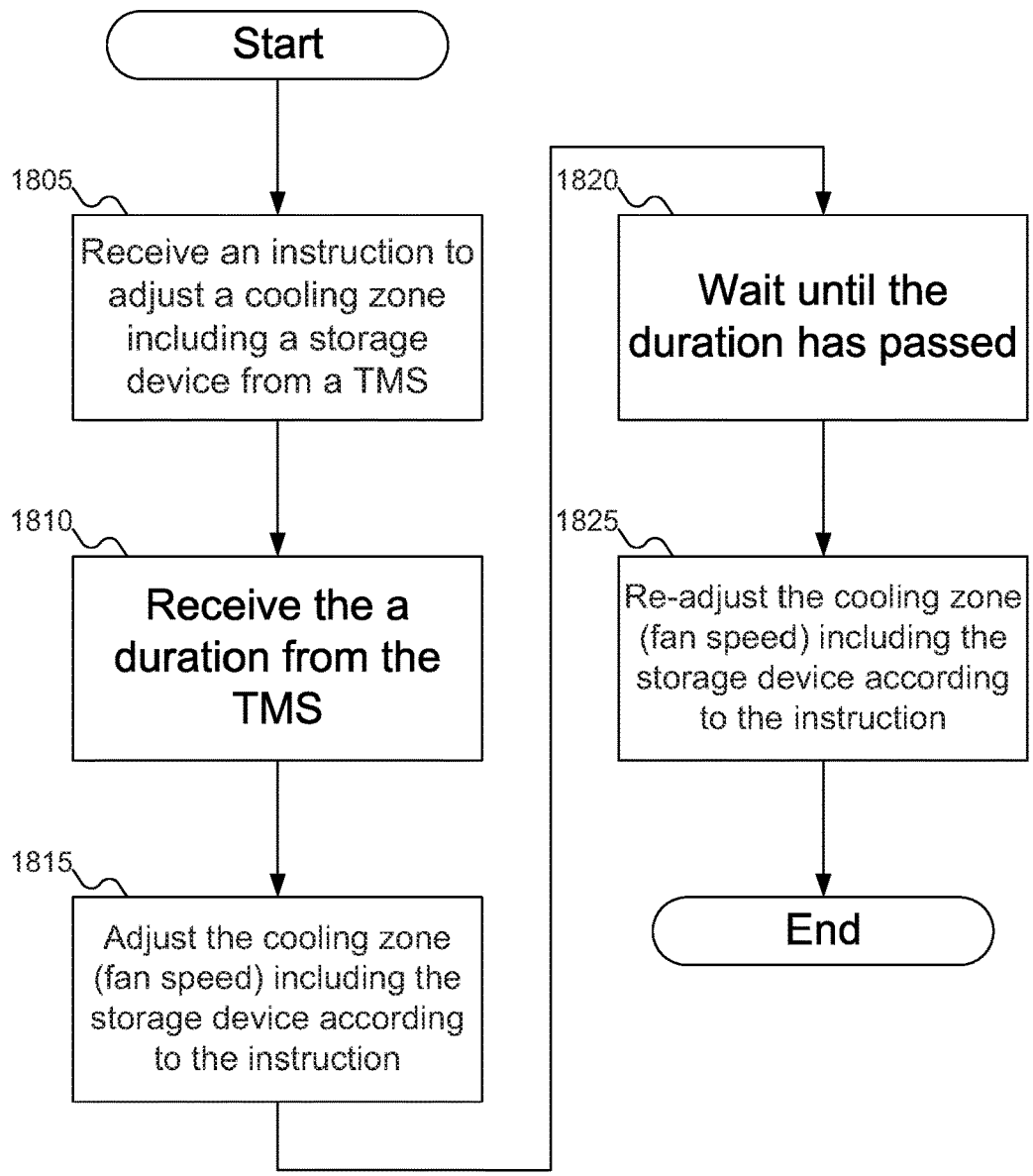
FIG. 18 shows an example flowchart of a procedure for the BMC of FIG. 1 to receive an instruction from the TMS of FIG. 1 and to adjust the cooling mechanism of the server of FIG. 1, according to an embodiment of the inventive concept.

FIG. 18 shows an example flowchart of a procedure for BMC 125 of FIG. 1 to receive instruction 420 of FIG. 4 from TMS 135 of FIG. 1 and to adjust the cooling system of server 105 of FIG. 1, according to an embodiment of the inventive concept. In FIG. 18, at block 1805, BMC 125 of FIG. 1 may receive instruction 420 of FIG. 4 from TMS 135 of FIG. 1. At block 1810, BMC 125 of FIG. 1 may receive duration 625 of FIG. 6 from TMS 135 of FIG. 1. At block 1815, BMC 125 of FIG. 1 may adjust the cooling system for cooling zone 715 of FIG. 7 including storage device 120 of FIG. 1 in accordance with instruction 420 of FIG. 4. At block 1820, BMC 125 of FIG. 1 may wait until duration 625 of FIG. 6 has elapsed. Then at block 1825, BMC 125 of FIG. 1 may re-adjust the cooling system for cooling zone 715 of FIG. 7 including storage device 120 of FIG. 1.

FIG. 18 shows BMC 125 of FIG. 1 as being responsible for measuring duration 625 of FIG. 6. Other embodiments of the inventive concept may leave the responsibility for measuring duration 625 of FIG. 6 with TMS 135 of FIG. 1. In such embodiments of the inventive concept, blocks 1810, 1820, and 1825 may be omitted with no loss of generality, as TMS 135 of FIG. 1 will then be responsible for instructing BMC 125 of FIG. 1 as to what changes to make to the cooling system, and when to make those changes.

In FIGS. 9-18, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a storage device, comprising:
 data storage to store data;
 an operation sensor to determine a change in operation of the storage device; and
 a transmitter to transmit the change in the operation of the storage device to a Thermal Management System (TMS).

Statement 2. An embodiment of the inventive concept includes a storage device according to statement 1, wherein the storage device includes a Solid State Drive (SSD).

Statement 3. An embodiment of the inventive concept includes a storage device according to statement 1, wherein the operation sensor includes at least one of a thermal sensor, a wattmeter to measure a power used by the storage device, and a power predictor to predict a power used by the storage device.

Statement 4. An embodiment of the inventive concept includes a storage device according to statement 1, further comprising storage for a thermal profile, the thermal profile including an identifier for the storage device, at least one threshold, and instructions for adjusting a cooling zone including the storage device.

Statement 5. An embodiment of the inventive concept includes a storage device according to statement 4, wherein the instructions for adjusting the cooling zone including the storage device include a fan speed.

Statement 6. An embodiment of the inventive concept includes a storage device according to statement 4, wherein the instructions for adjusting the cooling zone including the storage device include at least one of a coolant temperature and a coolant current in a coolant-based cooling system.

Statement 7. An embodiment of the inventive concept includes a storage device according to statement 4, wherein the at least one threshold includes a lower threshold and an upper threshold.

Statement 8. An embodiment of the inventive concept includes a storage device according to statement 7, wherein the storage is operative to store a plurality of thermal profiles, each thermal profile including a lower threshold, an upper threshold, and instructions for adjusting the cooling zone including the storage device.

Statement 9. An embodiment of the inventive concept includes a storage device according to statement 7, wherein:
 the lower threshold includes a lower power consumption threshold; and
 the upper threshold includes an upper power consumption threshold.

Statement 10. An embodiment of the inventive concept includes a storage device according to statement 7, wherein:
 the lower threshold includes a lower temperature threshold; and
 the upper threshold includes an upper temperature threshold.

Statement 11. An embodiment of the inventive concept includes a storage device according to statement 7, wherein the thermal profile further includes a duration.

Statement 12. An embodiment of the inventive concept includes a storage device according to statement 7, wherein the thermal profile further includes an identifier for a cooling zone.

Statement 13. An embodiment of the inventive concept includes a storage device according to statement 7, wherein the instructions for adjusting a cooling zone including the storage device includes a fan speed.

Statement 14. An embodiment of the inventive concept includes a memory for storing a thermal profile data for use by a Thermal Management System (TMS), comprising:
 a data structure stored in the memory, the data structure including information used by the TMS and including:
  an identifier for a storage device;
  at least one threshold; and
  instructions for adjusting a cooling zone including the storage device.

Statement 15. An embodiment of the inventive concept includes a memory according to statement 14, wherein the at least one threshold includes:
 a lower threshold; and
 an upper threshold.

Statement 16. An embodiment of the inventive concept includes a memory according to statement 15, wherein:
 the lower threshold includes a lower power consumption threshold; and
 the upper threshold includes an upper power consumption threshold.

Statement 17. An embodiment of the inventive concept includes a memory according to statement 15, wherein:
 the lower threshold includes a lower temperature threshold; and
 the upper threshold includes an upper temperature threshold.

Statement 18. An embodiment of the inventive concept includes a memory according to statement 14, wherein the data structure further includes a duration.

Statement 19. An embodiment of the inventive concept includes a memory according to statement 14, wherein the data structure further includes an identifier for the cooling zone.

Statement 20. An embodiment of the inventive concept includes a memory according to statement 14, wherein the instructions for adjusting a cooling zone including a storage device include a fan speed.

Statement 21. An embodiment of the inventive concept includes a memory according to statement 14, wherein the instructions for adjusting a cooling zone including a storage device include at least one of a coolant temperature and a coolant current in a coolant-based cooling system.

Statement 22. An embodiment of the inventive concept includes a Thermal Management System (TMS), comprising:
 reception logic to receive information from a storage device regarding a change in operation in the storage device;
 cooling zone identification logic to identify a cooling zone including the storage device; and transmission logic to send an instruction to a Baseboard Management Controller (BMC) to adjust the cooling zone including the storage device, the instruction based on the information received from the storage device.

Statement 23. An embodiment of the inventive concept includes a TMS according to statement 22, wherein the storage device includes a Solid State Drive (SSD).

Statement 24. An embodiment of the inventive concept includes a TMS according to statement 22, further comprising a thermal profile identification logic to identify a thermal profile including an identifier for the storage device and at least one threshold.

Statement 25. An embodiment of the inventive concept includes a TMS according to statement 24, wherein:
the reception logic is operative to receive a new power consumption for the storage device; and
the at least one threshold includes a lower power consumption threshold and an upper power consumption threshold, wherein the new power consumption is greater than the lower power consumption threshold and lower than the upper power consumption threshold.

Statement 26. An embodiment of the inventive concept includes a TMS according to statement 24, wherein:
the reception logic is operative to receive a new temperature for the storage device; and
the at least one threshold includes a lower temperature threshold and an upper temperature threshold, wherein the new temperature is greater than the lower temperature threshold and lower than the upper temperature threshold.

Statement 27. An embodiment of the inventive concept includes a TMS according to statement 26, wherein:
the reception logic is operative to receive a new power consumption for the storage device; and
the TMS further comprises a mapping logic to map the new power consumption for the storage device to the new temperature.

Statement 28. An embodiment of the inventive concept includes a TMS according to statement 22, wherein:
the TMS further comprises thermal profile accessing logic to access a fan speed from a thermal profile; and
the transmission logic is operative to send the fan speed to the BMC.

Statement 29. An embodiment of the inventive concept includes a TMS according to statement 22, wherein:
the TMS further comprises thermal profile accessing logic to access at least one of a coolant temperature and a coolant current in a coolant-based cooling system from a thermal profile; and
the transmission logic is operative to send the at least one of the coolant temperature and the coolant current to the BMC.

Statement 30. An embodiment of the inventive concept includes a TMS according to statement 22, further comprising thermal profile accessing logic to access a duration from a thermal profile.

Statement 31. An embodiment of the inventive concept includes a TMS according to statement 30, wherein the transmission logic is operative to send the duration to the BMC.

Statement 32. An embodiment of the inventive concept includes a TMS according to statement 30, wherein:
the TMS further comprises a timer to time the duration; and
the transmission logic is further operative to send a second instruction to the BMC to re-adjust the cooling zone including the storage device when the timer determines that the duration has passed.

Statement 33. An embodiment of the inventive concept includes a TMS according to statement 22, further comprising storage for a plurality of thermal profiles for a storage device.

Statement 34. An embodiment of the inventive concept includes a TMS according to statement 33, wherein the storage is operative to store a plurality of thermal profiles for a plurality of storage devices.

Statement 35. An embodiment of the inventive concept includes a method, comprising:
determining, at a storage device a need to adjust a cooling zone including the storage device; and
sending information from the storage device to adjust the cooling zone including the storage device.

Statement 36. An embodiment of the inventive concept includes a method according to statement 35, wherein the storage device includes a Solid State Drive (SSD).

Statement 37. An embodiment of the inventive concept includes a method according to statement 35, wherein determining, at a storage device a need to adjust a cooling zone including the storage device includes receiving data that a power consumption of the storage device is changing.

Statement 38. An embodiment of the inventive concept includes a method according to statement 37, wherein receiving data that a power consumption of the storage device is changing includes receiving the data that the power consumption of the storage device is changing responsive to instructions received at the storage device.

Statement 39. An embodiment of the inventive concept includes a method according to statement 35, wherein determining, at a storage device a need to adjust a cooling zone including the storage device includes predicting a power consumption of the storage device.

Statement 40. An embodiment of the inventive concept includes a method according to statement 35, wherein determining, at a storage device a need to adjust a cooling zone including the storage device includes receiving data that a temperature of the storage device is changing.

Statement 41. An embodiment of the inventive concept includes a method according to statement 40, wherein receiving data that a temperature of the storage device is changing includes receiving the data from a thermal sensor on the storage device that the temperature of the storage device is changing.

Statement 42. An embodiment of the inventive concept includes a method according to statement 40, wherein receiving data that a temperature of the storage device is changing includes:
receiving a new power consumption for the storage device; and
mapping the new power consumption for the storage device to the new temperature for the storage device.

Statement 43. An embodiment of the inventive concept includes a method according to statement 35, wherein determining, at a storage device a need to adjust a cooling zone including the storage device includes predicting a temperature of the storage device.

Statement 44. An embodiment of the inventive concept includes a method according to statement 43, wherein predicting a temperature of the storage device includes predicting the temperature of the storage device by the storage device.

Statement 45. An embodiment of the inventive concept includes a method according to statement 35, wherein sending information from the storage device to adjust the cooling zone including the storage device includes sending a duration to adjust the cooling zone including the storage device.

Statement 46. An embodiment of the inventive concept includes a method according to statement 45, wherein sending a duration to adjust the cooling zone including the storage device includes accessing the duration to adjust the cooling zone including the storage device from a thermal profile.

Statement 47. An embodiment of the inventive concept includes a method according to statement 35, wherein sending information from the storage device to adjust the cooling zone including the storage device includes sending a fan speed from the storage device.

Statement 48. An embodiment of the inventive concept includes a method according to statement 35, wherein sending information from the storage device to adjust the cooling zone including the storage device includes sending at least one of a coolant temperature and a coolant current in a coolant-based cooling system from the storage device.

Statement 49. An embodiment of the inventive concept includes a method, comprising:
receiving information from a storage device regarding a change in operation in the storage device;
identifying a cooling zone including the storage device; and
sending an instruction to a Baseboard Management Controller (BMC) to adjust the cooling zone including the storage device, the instruction based on the information received from the storage device.

Statement 50. An embodiment of the inventive concept includes a method according to statement 49, wherein the storage device includes a Solid State Drive (SSD).

Statement 51. An embodiment of the inventive concept includes a method according to statement 49, wherein receiving information from a storage device regarding a change in operation in the storage device includes identifying a thermal profile, the thermal profile including at least one threshold.

Statement 52. An embodiment of the inventive concept includes a method according to statement 51, wherein:
receiving information from a storage device regarding a change in operation in the storage device further includes receiving a new power consumption for the storage device; and
the at least one threshold includes a lower power consumption threshold and an upper power consumption threshold, wherein the new power consumption is greater than the lower power consumption threshold and lower than the upper power consumption threshold.

Statement 53. An embodiment of the inventive concept includes a method according to statement 51, wherein:
receiving information from a storage device regarding a change in operation in the storage device further includes receiving a new temperature for the storage device; and
the at least one threshold includes a lower temperature threshold and an upper temperature threshold, wherein the new temperature is greater than the lower temperature threshold and lower than the upper temperature threshold.

Statement 54. An embodiment of the inventive concept includes a method according to statement 53, wherein receiving a new temperature for the storage device includes:
receiving a new power consumption for the storage device; and
mapping the new power consumption for the storage device to the new temperature for the storage device.

Statement 55. An embodiment of the inventive concept includes a method according to statement 49, wherein sending an instruction to a Baseboard Management Controller (BMC) to adjust the cooling zone including the storage device includes:
accessing a fan speed from a thermal profile; and
sending the fan speed to the BMC.

Statement 56. An embodiment of the inventive concept includes a method according to statement 49, wherein sending an instruction to a BMC to adjust the cooling zone including the storage device includes:
accessing at least one of a coolant temperature and a coolant current from a thermal profile; and
sending the at least one of the coolant temperature and the coolant current to the BMC.

Statement 57. An embodiment of the inventive concept includes a method according to statement 49, wherein sending an instruction to a Baseboard Management Controller (BMC) to adjust the cooling zone including the storage device further includes accessing a duration to adjust the cooling zone including the storage device from a thermal profile.

Statement 58. An embodiment of the inventive concept includes a method according to statement 57, wherein sending an instruction to a Baseboard Management Controller (BMC) to adjust the cooling zone including the storage device further includes sending to the BMC the duration to adjust the cooling zone including the storage device.

Statement 59. An embodiment of the inventive concept includes a method according to statement 57, further comprising:
waiting until the duration has passed; and
sending a second instruction to the BMC to re-adjust the cooling zone including the storage device.

Statement 60. An embodiment of the inventive concept includes a method according to statement 49, further comprising:
accessing the cooling zone including the storage device from the BMC; and
storing the cooling zone including the storage device in a thermal profile.

Statement 61. An embodiment of the inventive concept includes a method according to statement 49, further comprising:
receiving the cooling zone including the storage device from a Basic Input/Output System (BIOS); and
storing the cooling zone including the storage device in a thermal profile.

Statement 62. An embodiment of the inventive concept includes a method, comprising:
determining, at a storage device a need to adjust a cooling zone including the storage device;
sending information from the storage device to a Thermal Management System (TMS) to adjust the cooling zone including the storage device;
receiving the information from the storage device at the TMS to adjust the cooling zone including the storage device;
identifying the cooling zone including the storage device; and
sending an instruction from the TMS to a Baseboard Management Controller (BMC) to adjust the cooling zone including the storage device, the instruction based on the information received from the storage device.

Statement 63. An embodiment of the inventive concept includes a method according to statement 62, wherein the storage device includes a Solid State Drive (SSD).

Statement 64. An embodiment of the inventive concept includes a method according to statement 62, wherein determining, at a storage device a need to adjust a cooling zone including the storage device includes receiving data that a power consumption of the storage device is changing.

Statement 65. An embodiment of the inventive concept includes a method according to statement 64, wherein receiving data that a power consumption of the storage device is changing includes receiving the data that a power consumption of the storage device is changing responsive to instructions received at the storage device.

Statement 66. An embodiment of the inventive concept includes a method according to statement 62, wherein determining, at a storage device a need to adjust a cooling zone including the storage device includes predicting a power consumption of the storage device.

Statement 67. An embodiment of the inventive concept includes a method according to statement 62, wherein determining, at a storage device a need to adjust a cooling zone including the storage device includes receiving data that a temperature of the storage device is changing.

Statement 68. An embodiment of the inventive concept includes a method according to statement 67, wherein receiving data that a temperature of the storage device is changing includes receiving the data from a thermal sensor on the storage device that the temperature of the storage device is changing.

Statement 69. An embodiment of the inventive concept includes a method according to statement 62, wherein determining, at a storage device a need to adjust a cooling zone including the storage device includes predicting a temperature of the storage device.

Statement 70. An embodiment of the inventive concept includes a method according to statement 69, wherein predicting a temperature of the storage device includes predicting the temperature of the storage device by the storage device.

Statement 71. An embodiment of the inventive concept includes a method according to statement 62, wherein sending information from the storage device to adjust the cooling zone including the storage device includes sending a duration to adjust the cooling zone including the storage device.

Statement 72. An embodiment of the inventive concept includes a method according to statement 62, wherein sending information from the storage device to adjust the cooling zone including the storage device includes sending a fan speed from the storage device.

Statement 73. An embodiment of the inventive concept includes a method according to statement 62, wherein sending information from the storage device to adjust the cooling zone including the storage device includes sending at least one of a coolant temperature and a coolant current in a coolant-based cooling system from the storage device.

Statement 74. An embodiment of the inventive concept includes a method according to statement 62, wherein receiving the information from the storage device at the TMS regarding a change in operation in the storage device includes identifying a thermal profile, the thermal profile including at least one threshold.

Statement 75. An embodiment of the inventive concept includes a method according to statement 74, wherein:
receiving the information from the storage device at the TMS regarding a change in operation in the storage device further includes receiving a new power consumption for the storage device; and
the at least one threshold includes a lower power consumption threshold and an upper power consumption threshold, wherein the new power consumption is greater than the lower power consumption threshold and lower than the upper power consumption threshold.

Statement 76. An embodiment of the inventive concept includes a method according to statement 62, wherein:
receiving the information from the storage device at the TMS regarding a change in operation in the storage device further includes receiving a new temperature for the storage device; and
the at least one threshold includes a lower temperature threshold and an upper temperature threshold, wherein the new temperature is greater than the lower temperature threshold and lower than the upper temperature threshold.

Statement 77. An embodiment of the inventive concept includes a method according to statement 76, wherein receiving a new temperature for the storage device includes:
receiving a new power consumption for the storage device; and
mapping the new power consumption for the storage device to the new temperature for the storage device.

Statement 78. An embodiment of the inventive concept includes a method according to statement 62, wherein sending an instruction from the TMS to a Baseboard Management Controller (BMC) to adjust the cooling zone including the storage device includes:
accessing a fan speed from a thermal profile; and
sending the fan speed to the BMC.

Statement 79. An embodiment of the inventive concept includes a method according to statement 62, wherein sending an instruction to a BMC to adjust the cooling zone including the storage device includes:
accessing at least one of a coolant temperature and a coolant current from a thermal profile; and
sending the at least one of the coolant temperature and the coolant current to the BMC.

Statement 80. An embodiment of the inventive concept includes a method according to statement 62, wherein receiving the information from the storage device at the TMS regarding a change in operation in the storage device includes accessing a duration to adjust the cooling zone including the storage device from a thermal profile.

Statement 81. An embodiment of the inventive concept includes a method according to statement 80, wherein receiving the information from the storage device at the TMS regarding a change in operation in the storage device further includes sending to the BMC the duration to adjust the cooling zone including the storage device.

Statement 82. An embodiment of the inventive concept includes a method according to statement 80, further comprising:
waiting until the duration has passed; and
sending a second instruction to the BMC to re-adjust the cooling zone including the storage device.

Statement 83. An embodiment of the inventive concept includes a method according to statement 62, further comprising:
receiving the instruction from the TMS at the BMC to adjust the cooling zone including the storage device; and
adjusting the cooling zone including the storage device by the BMC.

Statement 84. An embodiment of the inventive concept includes a method according to statement 83, wherein adjusting the cooling zone including the storage device by the BMC includes adjusting a fan speed for the cooling zone by the BMC.

Statement 85. An embodiment of the inventive concept includes a method according to statement 83, wherein adjusting the cooling zone including the storage device by the BMC includes adjusting one of a coolant temperature and a coolant current for the cooling zone by the BMC.

Statement 86. An embodiment of the inventive concept includes a method according to statement 83, wherein adjusting the cooling zone including the storage device by the BMC includes:

sending a second instruction from the TMS to the BMC specifying a duration to adjust the cooling zone including the storage device;

receiving the second instruction at the BMC from the TMS specifying the duration to adjust the cooling zone including the storage device;

waiting until the duration has passed; and re-adjusting the cooling zone including the storage device by the BMC.

Statement 87. An embodiment of the inventive concept includes a method according to statement 62, further comprising:

accessing the cooling zone including the storage device from the BMC; and storing the cooling zone including the storage device in a thermal profile.

Statement 88. An embodiment of the inventive concept includes a method according to statement 62, further comprising:

receiving the cooling zone including the storage device from a Basic Input/Output System (BIOS); and storing the cooling zone including the storage device in a thermal profile.

Statement 89. An embodiment of the inventive concept includes an article, comprising a tangible storage medium, the tangible storage medium having stored thereon non-transitory instructions that, when executed by a machine, result in:

determining, at a storage device a need to adjust a cooling zone including the storage device; and sending information from the storage device to adjust the cooling zone including the storage device.

Statement 90. An embodiment of the inventive concept includes an article according to statement 89, wherein the storage device includes a Solid State Drive (SSD).

Statement 91. An embodiment of the inventive concept includes an article according to statement 89, wherein determining, at a storage device a need to adjust a cooling zone including the storage device includes receiving data that a power consumption of the storage device is changing.

Statement 92. An embodiment of the inventive concept includes an article according to statement 91, wherein receiving data that a power consumption of the storage device is changing includes receiving the data that the power consumption of the storage device is changing responsive to instructions received at the storage device.

Statement 93. An embodiment of the inventive concept includes an article according to statement 89, wherein determining, at a storage device a need to adjust a cooling zone including the storage device includes predicting a power consumption of the storage device.

Statement 94. An embodiment of the inventive concept includes an article according to statement 89, wherein determining, at a storage device a need to adjust a cooling zone including the storage device includes receiving data that a temperature of the storage device is changing.

Statement 95. An embodiment of the inventive concept includes an article according to statement 94, wherein receiving data that a temperature of the storage device is changing includes receiving the data from a thermal sensor on the storage device that the temperature of the storage device is changing.

Statement 96. An embodiment of the inventive concept includes an article according to statement 94, wherein receiving data that a temperature of the storage device is changing includes:

receiving a new power consumption for the storage device; and mapping the new power consumption for the storage device to the new temperature for the storage device.

Statement 97. An embodiment of the inventive concept includes an article according to statement 89, wherein determining, at a storage device a need to adjust a cooling zone including the storage device includes predicting a temperature of the storage device.

Statement 98. An embodiment of the inventive concept includes an article according to statement 97, wherein predicting a temperature of the storage device includes predicting the temperature of the storage device by the storage device.

Statement 99. An embodiment of the inventive concept includes an article according to statement 89, wherein sending information from the storage device to adjust the cooling zone including the storage device includes sending a duration to adjust the cooling zone including the storage device.

Statement 100. An embodiment of the inventive concept includes an article according to statement 99, wherein sending a duration to adjust the cooling zone including the storage device includes accessing the duration to adjust the cooling zone including the storage device from a thermal profile.

Statement 101. An embodiment of the inventive concept includes an article according to statement 89, wherein sending information from the storage device to adjust the cooling zone including the storage device includes sending a fan speed from the storage device.

Statement 102. An embodiment of the inventive concept includes an article according to statement 89, wherein sending information from the storage device to adjust the cooling zone including the storage device includes sending at least one of a coolant temperature and a coolant current in a coolant-based cooling system from the storage device.

Statement 103. An embodiment of the inventive concept includes an article, comprising a tangible storage medium, the tangible storage medium having stored thereon non-transitory instructions that, when executed by a machine, result in:

receiving information from a storage device regarding a change in operation in the storage device;

identifying a cooling zone including the storage device; and sending an instruction to a Baseboard Management Controller (BMC) to adjust the cooling zone including the storage device, the instruction based on the information received from the storage device.

Statement 104. An embodiment of the inventive concept includes an article according to statement 103, wherein the storage device includes a Solid State Drive (SSD).

Statement 105. An embodiment of the inventive concept includes an article according to statement 103, wherein receiving information from a storage device regarding a change in operation in the storage device includes identifying a thermal profile, the thermal profile including at least one threshold.

Statement 106. An embodiment of the inventive concept includes an article according to statement 105, wherein:

receiving information from a storage device regarding a change in operation in the storage device further includes receiving a new power consumption for the storage device; and the at least one threshold includes a lower power consumption threshold and an upper power consumption threshold, wherein the new power consumption is greater than the lower power consumption threshold and lower than the upper power consumption threshold.

Statement 107. An embodiment of the inventive concept includes an article according to statement 105, wherein:

receiving information from a storage device regarding a change in operation in the storage device further includes receiving a new temperature for the storage device; and the at least one threshold includes a lower temperature threshold and an upper temperature threshold, wherein the new temperature is greater than the lower temperature threshold and lower than the upper temperature threshold.

Statement 108. An embodiment of the inventive concept includes an article according to statement 107, wherein receiving a new temperature for the storage device includes:

receiving a new power consumption for the storage device; and mapping the new power consumption for the storage device to the new temperature for the storage device.

Statement 109. An embodiment of the inventive concept includes an article according to statement 103, wherein sending an instruction to a Baseboard Management Controller (BMC) to adjust the cooling zone including the storage device includes:

accessing a fan speed from a thermal profile; and sending the fan speed to the BMC.

Statement 110. An embodiment of the inventive concept includes an article according to statement 103, wherein sending an instruction to a BMC to adjust the cooling zone including the storage device includes:

accessing at least one of a coolant temperature and a coolant current from a thermal profile; and sending the at least one of the coolant temperature and the coolant current to the BMC.

Statement 111. An embodiment of the inventive concept includes an article according to statement 103, wherein sending an instruction to a Baseboard Management Controller (BMC) to adjust the cooling zone including the storage device further includes accessing a duration to adjust the cooling zone including the storage device from a thermal profile.

Statement 112. An embodiment of the inventive concept includes an article according to statement 111, wherein sending an instruction to a Baseboard Management Controller (BMC) to adjust the cooling zone including the storage device further includes sending to the BMC the duration to adjust the cooling zone including the storage device.

Statement 113. An embodiment of the inventive concept includes an article according to statement 111, the tangible storage medium having stored thereon further non-transitory instructions that, when executed by the machine, result in:

waiting until the duration has passed; and sending a second instruction to the BMC to re-adjust the cooling zone including the storage device.

Statement 114. An embodiment of the inventive concept includes an article according to statement 103, the tangible storage medium having stored thereon further non-transitory instructions that, when executed by the machine, result in:

accessing the cooling zone including the storage device from the BMC; and storing the cooling zone including the storage device in a thermal profile.

Statement 115. An embodiment of the inventive concept includes an article according to statement 103, the tangible storage medium having stored thereon further non-transitory instructions that, when executed by the machine, result in:

receiving the cooling zone including the storage device from a Basic Input/Output System (BIOS); and storing the cooling zone including the storage device in a thermal profile.

Statement 116. An embodiment of the inventive concept includes an article, comprising a tangible storage medium, the tangible storage medium having stored thereon non-transitory instructions that, when executed by a machine, result in:

determining, at a storage device a need to adjust a cooling zone including the storage device;

sending information from the storage device to a Thermal Management System (TMS) to adjust the cooling zone including the storage device;

receiving the information from the storage device at the TMS to adjust the cooling zone including the storage device;

identifying the cooling zone including the storage device; and sending an instruction from the TMS to a Baseboard Management Controller (BMC) to adjust the cooling zone including the storage device, the instruction based on the information received from the storage device.

Statement 117. An embodiment of the inventive concept includes an article according to statement 116, wherein the storage device includes a Solid State Drive (SSD).

Statement 118. An embodiment of the inventive concept includes an article according to statement 116, wherein determining, at a storage device a need to adjust a cooling zone including the storage device includes receiving data that a power consumption of the storage device is changing.

Statement 119. An embodiment of the inventive concept includes an article according to statement 118, wherein receiving data that a power consumption of the storage device is changing includes receiving the data that a power consumption of the storage device is changing responsive to instructions received at the storage device.

Statement 120. An embodiment of the inventive concept includes an article according to statement 116, wherein determining, at a storage device a need to adjust a cooling zone including the storage device includes predicting a power consumption of the storage device.

Statement 121. An embodiment of the inventive concept includes an article according to statement 116, wherein determining, at a storage device a need to adjust a cooling zone including the storage device includes receiving data that a temperature of the storage device is changing.

Statement 122. An embodiment of the inventive concept includes an article according to statement 121, wherein receiving data that a temperature of the storage device is changing includes receiving the data from a thermal sensor on the storage device that the temperature of the storage device is changing.

Statement 123. An embodiment of the inventive concept includes an article according to statement 116, wherein determining, at a storage device a need to adjust a cooling zone including the storage device includes predicting a temperature of the storage device.

Statement 124. An embodiment of the inventive concept includes an article according to statement 123, wherein predicting a temperature of the storage device includes predicting the temperature of the storage device by the storage device.

Statement 125. An embodiment of the inventive concept includes an article according to statement 116, wherein sending information from the storage device to adjust the cooling zone including the storage device includes sending a duration to adjust the cooling zone including the storage device.

Statement 126. An embodiment of the inventive concept includes an article according to statement 116, wherein sending information from the storage device to adjust the cooling zone including the storage device includes sending a fan speed from the storage device.

Statement 127. An embodiment of the inventive concept includes an article according to statement 116, wherein sending information from the storage device to adjust the cooling zone including the storage device includes sending at least one of a coolant temperature and a coolant current in a coolant-based cooling system from the storage device.

Statement 128. An embodiment of the inventive concept includes an article according to statement 116, wherein receiving the information from the storage device at the TMS regarding a change in operation in the storage device includes identifying a thermal profile, the thermal profile including at least one threshold.

Statement 129. An embodiment of the inventive concept includes an article according to statement 128, wherein:
receiving the information from the storage device at the TMS regarding a change in operation in the storage device further includes receiving a new power consumption for the storage device; and
the at least one threshold includes a lower power consumption threshold and an upper power consumption threshold, wherein the new power consumption is greater than the lower power consumption threshold and lower than the upper power consumption threshold.

Statement 130. An embodiment of the inventive concept includes an article according to statement 116, wherein:
receiving the information from the storage device at the TMS regarding a change in operation in the storage device further includes receiving a new temperature for the storage device; and
the at least one threshold includes a lower temperature threshold and an upper temperature threshold, wherein the new temperature is greater than the lower temperature threshold and lower than the upper temperature threshold.

Statement 131. An embodiment of the inventive concept includes an article according to statement 130, wherein receiving a new temperature for the storage device includes:
receiving a new power consumption for the storage device; and
mapping the new power consumption for the storage device to the new temperature for the storage device.

Statement 132. An embodiment of the inventive concept includes an article according to statement 116, wherein sending an instruction from the TMS to a Baseboard Management Controller (BMC) to adjust the cooling zone including the storage device includes:
accessing a fan speed from a thermal profile; and
sending the fan speed to the BMC.

Statement 133. An embodiment of the inventive concept includes an article according to statement 116, wherein sending an instruction to a BMC to adjust the cooling zone including the storage device includes:
accessing at least one of a coolant temperature and a coolant current from a thermal profile; and
sending the at least one of the coolant temperature and the coolant current to the BMC.

Statement 134. An embodiment of the inventive concept includes an article according to statement 116, wherein receiving the information from the storage device at the TMS regarding a change in operation in the storage device includes accessing a duration to adjust the cooling zone including the storage device from a thermal profile.

Statement 135. An embodiment of the inventive concept includes an article according to statement 134, wherein receiving the information from the storage device at the TMS regarding a change in operation in the storage device further includes sending to the BMC the duration to adjust the cooling zone including the storage device.

Statement 136. An embodiment of the inventive concept includes an article according to statement 134, the tangible storage medium having stored thereon further non-transitory instructions that, when executed by the machine, result in:
waiting until the duration has passed; and
sending a second instruction to the BMC to re-adjust the cooling zone including the storage device.

Statement 137. An embodiment of the inventive concept includes an article according to statement 116, the tangible storage medium having stored thereon further non-transitory instructions that, when executed by the machine, result in:
receiving the instruction from the TMS at the BMC to adjust the cooling zone including the storage device; and
adjusting the cooling zone including the storage device by the BMC.

Statement 138. An embodiment of the inventive concept includes an article according to statement 137, wherein adjusting the cooling zone including the storage device by the BMC includes adjusting a fan speed for the cooling zone by the BMC.

Statement 139. An embodiment of the inventive concept includes an article according to statement 137, wherein adjusting the cooling zone including the storage device by the BMC includes adjusting one of a coolant temperature and a coolant current for the cooling zone by the BMC.

Statement 140. An embodiment of the inventive concept includes an article according to statement 137, wherein adjusting the cooling zone including the storage device by the BMC includes:
sending a second instruction from the TMS to the BMC specifying a duration to adjust the cooling zone including the storage device;
receiving the second instruction at the BMC from the TMS specifying the duration to adjust the cooling zone including the storage device;
waiting until the duration has passed; and
re-adjusting the cooling zone including the storage device by the BMC.

Statement 141. An embodiment of the inventive concept includes an article according to statement 116, the tangible storage medium having stored thereon further non-transitory instructions that, when executed by the machine, result in:
accessing the cooling zone including the storage device from the BMC; and
storing the cooling zone including the storage device in a thermal profile.

Statement 142. An embodiment of the inventive concept includes an article according to statement 116, the tangible storage medium having stored thereon further non-transitory instructions that, when executed by the machine, result in:
receiving the cooling zone including the storage device from a Basic Input/Output System (BIOS); and storing the cooling zone including the storage device in a thermal profile.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A storage device, comprising:
   data storage to store data;
   an operation sensor to determine a change in operation of the storage device; and
   a transmitter to transmit the change in the operation of the storage device to a Thermal Management System (TMS), the TMS including storage for a thermal profile, the thermal profile including an identifier for the storage device, at least one threshold, and instructions for adjusting a cooling zone including the storage device,
   wherein the TMS is operative to use the thermal profile to identify the cooling zone including the storage device and to send the instructions for adjusting the cooling zone including the storage device to a Baseboard Management Controller (BMC), the BMC operative to implement the instructions for adjusting the cooling zone including the storage device to cool the storage device, and
   wherein the storage device is a non-volatile storage device.

2. A storage device according to claim 1, wherein the storage device includes a Solid State Drive (SSD).

3. A storage device according to claim 1, wherein the operation sensor includes at least one of a thermal sensor, a wattmeter to measure a power used by the storage device, and a power predictor to predict a power used by the storage device.

4. A storage device according to claim 1, wherein the instructions for adjusting the cooling zone including the storage device include a fan speed.

5. A storage device according to claim 1, wherein the instructions for adjusting the cooling zone including the storage device include at least one of a liquid coolant temperature and a liquid coolant current in a liquid coolant-based cooling system.

6. A storage device according to claim 1, wherein:
   the at least one threshold includes a lower threshold and an upper threshold;
   the lower threshold and the upper threshold measure a common property; and
   the common property is drawn from a set including temperature and power consumption.

7. A storage device according to claim 6, wherein the storage is operative to store a plurality of thermal profiles, each thermal profile including a lower threshold, an upper threshold, and instructions for adjusting the cooling zone including the storage device.

8. A Thermal Management System (TMS), comprising:
   reception logic to receive information from a storage device regarding a change in operation in the storage device;
   cooling zone identification logic to identify a cooling zone including the storage device; and
   transmission logic to send an instruction to a Baseboard Management Controller (BMC) to adjust the cooling zone including the storage device, the instruction based on the information received from the storage device.

9. A TMS according to claim 8, wherein the storage device includes a Solid State Drive (SSD).

10. A TMS according to claim 8, further comprising a thermal profile identification logic to identify a thermal profile including an identifier for the storage device and at least one threshold,
    wherein the thermal profile is one of a plurality of thermal profiles.

11. A TMS according to claim 10, wherein:
    the reception logic is operative to receive a new power consumption for the storage device; and
    the at least one threshold includes a lower power consumption threshold and an upper power consumption threshold, wherein the new power consumption is greater than the lower power consumption threshold and lower than the upper power consumption threshold.

12. A TMS according to claim 10, wherein:
    the reception logic is operative to receive a new temperature for the storage device; and
    the at least one threshold includes a lower temperature threshold and an upper temperature threshold, wherein the new temperature is greater than the lower temperature threshold and lower than the upper temperature threshold.

13. A TMS according to claim 8, wherein:
    the TMS further comprises thermal profile accessing logic to access a fan speed from a thermal profile; and
    the transmission logic is operative to send the fan speed to the BMC.

14. A TMS according to claim 8, wherein:
    the TMS further comprises thermal profile accessing logic to access at least one of a liquid coolant temperature and a liquid coolant current in a liquid coolant-based cooling system from a thermal profile; and
    the transmission logic is operative to send the at least one of the liquid coolant temperature and the liquid coolant current to the BMC.

15. A TMS according to claim 8, further comprising thermal profile accessing logic to access a duration from a thermal profile.

16. A TMS according to claim 15, wherein:
    the TMS further comprises a timer to time the duration; and
    the transmission logic is further operative to send a second instruction to the BMC to re-adjust the cooling zone including the storage device when the timer determines that the duration has passed.

17. A TMS according to claim 8, wherein:
    the cooling zone including the storage device is one of a plurality of cooling zones managed by the BMC; and
    the storage device does not know in which of the one of the plurality of cooling zones the storage device is included.

18. A method, comprising:
    determining, at a storage device a need to adjust a cooling zone including the storage device; and
    sending information from the storage device to a Thermal Management System (TMS), the TMS including storage for a thermal profile, the thermal profile including an identifier for the storage device, at least one threshold, and instructions for adjusting a cooling zone including the storage device, to adjust the cooling zone including the storage device,
    wherein the TMS is operative to use the thermal profile to identify the cooling zone including the storage device from among a plurality of cooling zones and to send the instructions for adjusting the cooling zone including the storage device to a Baseboard Management Controller (BMC), the BMC operative to implement the instructions for adjusting the cooling zone including the storage device to cool the storage device, and wherein each of the at least one threshold in the thermal profile measures a common property, the common property drawn from a set including temperature and power consumption.

19. A method according to claim 18, wherein the storage device includes a Solid State Drive (SSD).

20. A method according to claim 18, wherein determining, at a storage device a need to adjust a cooling zone including the storage device includes receiving data that a power consumption of the storage device is changing.

21. A method according to claim 18, wherein determining, at a storage device a need to adjust a cooling zone including the storage device includes predicting a power consumption of the storage device.

22. A method according to claim 18, wherein determining, at a storage device a need to adjust a cooling zone including the storage device includes receiving data that a temperature of the storage device is changing.

23. A method according to claim 18, wherein sending information from the storage device to adjust the cooling zone including the storage device includes sending a duration to adjust the cooling zone including the storage device.

24. A method according to claim 23, wherein sending a duration to adjust the cooling zone including the storage device includes accessing the duration to adjust the cooling zone including the storage device from the thermal profile.

25. A method according to claim 18, wherein sending information from the storage device to adjust the cooling zone including the storage device includes sending a fan speed from the TMS to the BMC.

26. A method according to claim 18, wherein sending information from the storage device to adjust the cooling zone including the storage device includes sending at least one of a liquid coolant temperature and a liquid coolant current in a liquid coolant-based cooling system from the TMS to the BMC.

27. A method according to claim 18, further comprising:
identifying the cooling zone including the storage device by the TMS from a thermal profile, the thermal profile including an identifier for the storage device, at least one threshold, and instructions for adjusting the cooling zone including the storage device;
sending the instructions for adjusting the cooling zone including the storage device from the TMS to the BMC, the BMC operative to implement the instructions for adjusting the cooling zone including the storage device to cool the storage device.

* * * * *